US012641671B2

(12) United States Patent
Jung et al.

(10) Patent No.: US 12,641,671 B2
(45) Date of Patent: May 26, 2026

(54) ELECTRONIC DEVICE, METHOD, AND COMPUTER-READABLE STORAGE MEDIUM FOR OBTAINING INFORMATION ABOUT BASE STATION

(71) Applicant: Samsung Electronics Co., Ltd., Suwon-si (KR)

(72) Inventors: Euichang Jung, Suwon-si (KR); Hyoungjoo Lee, Suwon-si (KR); Jinwoo Kim, Suwon-si (KR); Minho Yang, Suwon-si (KR); Sanggeun Lee, Suwon-si (KR); Juhyun Lee, Suwon-si (KR); Chaiman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 18/421,166

(22) Filed: Jan. 24, 2024

(65) Prior Publication Data

US 2024/0163958 A1 May 16, 2024

Related U.S. Application Data

(63) Continuation of application No. PCT/KR2022/009604, filed on Jul. 4, 2022.

(30) Foreign Application Priority Data

| | | |
|---|---|---|
| Sep. 9, 2021 | (KR) | 10-2021-0120704 |
| Oct. 15, 2021 | (KR) | 10-2021-0137594 |

(51) Int. Cl.
| | |
|---|---|
| *H04W 4/00* | (2018.01) |
| *H04B 17/318* | (2015.01) |
| (Continued) | |

(52) U.S. Cl.
CPC .......... *H04W 76/27* (2018.02); *H04B 17/328* (2023.05); *H04W 24/10* (2013.01); *H04W 74/0833* (2013.01)

(58) Field of Classification Search
CPC . H04W 76/27; H04W 24/10; H04W 74/0833; H04W 48/16; H04W 52/0261;
(Continued)

(56) References Cited

U.S. PATENT DOCUMENTS

| | | | | |
|---|---|---|---|---|
| 6,704,581 B1 * | 3/2004 | Park | | H04W 36/0066 |
| | | | | 370/335 |
| 6,765,891 B2 * | 7/2004 | Laitinen | | H04W 8/183 |
| | | | | 370/465 |

(Continued)

FOREIGN PATENT DOCUMENTS

| | | |
|---|---|---|
| KR | 10-2017-0020234 A | 2/2017 |
| KR | 10-1950791 B1 | 2/2019 |

(Continued)

OTHER PUBLICATIONS

OPPO, Open issues for early measurement, R2-1914553, 3GPP TSG-RAN WG2 Meeting #108, Nov. 8, 2019.

(Continued)

*Primary Examiner* — Amancio Gonzalez
(74) *Attorney, Agent, or Firm* — Jefferson IP Law, LLP

(57) ABSTRACT

An electronic device is provided. The electronic device includes a first communication circuit for first wireless communication, a second communication circuit for second wireless communication, one or more processors, and memory storing one or more programs including instructions that, when executed by the one or more processors, cause the electronic device to identify a state of the electronic device while an operation mode for the first wireless communication is a radio resource control (RRC) idle mode, (Continued)

when the state of the electronic device corresponds to a specified state, measure at least one signal transmitted from a first base station for the second wireless communication, switch the operation mode from the RRC idle mode to an RRC connection mode after measuring the signal, and cause a second station for the first wireless communication to transmit a signal for requesting connection during a state in which the operation mode is in the RRC connection mode.

20 Claims, 17 Drawing Sheets

(51) Int. Cl.

| | | |
|---|---|---|
| *H04W 24/10* | (2009.01) | |
| *H04W 74/0833* | (2024.01) | |
| *H04W 76/27* | (2018.01) | |

(58) Field of Classification Search
CPC .... H04W 76/10; H04W 88/06; H04B 17/328; H04B 17/382; Y02D 30/70
USPC ......................................................... 370/329
See application file for complete search history.

(56) References Cited

U.S. PATENT DOCUMENTS

| | | | | |
|---|---|---|---|---|
| 8,437,311 | B2 * | 5/2013 | Deng .................... | H04W 24/10 |
| | | | | 455/432.1 |
| 9,107,165 | B2 * | 8/2015 | Yoshikawa ....... | H04W 52/0254 |
| 9,386,527 | B2 * | 7/2016 | Shana'a ............ | H04W 52/0245 |
| 9,426,697 | B2 * | 8/2016 | Burbidge ........... | H04W 84/042 |
| 9,713,069 | B2 * | 7/2017 | Jung ..................... | H04W 48/06 |
| 9,980,120 | B2 * | 5/2018 | Lee ....................... | H04W 8/005 |
| 10,050,343 | B2 * | 8/2018 | Clevorn .............. | H01Q 3/2605 |
| 10,057,800 | B2 * | 8/2018 | Liao ..................... | H04W 76/38 |
| 10,334,464 | B2 | 6/2019 | Hu | |
| 10,341,910 | B2 * | 7/2019 | Burbidge .......... | H04W 36/0066 |
| 10,499,441 | B2 * | 12/2019 | Jung .................... | H04W 48/20 |
| 10,805,926 | B2 | 10/2020 | Heo et al. | |
| 11,252,724 | B2 | 2/2022 | Sung et al. | |
| 11,895,720 | B2 * | 2/2024 | Virtej ................... | H04W 76/15 |
| 12,028,755 | B2 * | 7/2024 | Burbidge .......... | H04W 36/0061 |
| 12,035,399 | B2 * | 7/2024 | Palle .................... | H04W 24/10 |
| 12,089,163 | B2 * | 9/2024 | Wu .................... | H04W 52/0277 |
| 2015/0373603 | A1 * | 12/2015 | Jung ..................... | H04W 36/22 |
| | | | | 370/331 |
| 2017/0048906 | A1 | 2/2017 | Lee et al. | |
| 2018/0349655 | A1 * | 12/2018 | Tsuchida ........... | H04W 52/0225 |
| 2019/0037425 | A1 | 1/2019 | Hong et al. | |
| 2020/0029239 | A1 * | 1/2020 | Chen ..................... | H04W 76/19 |
| 2020/0305014 | A1 | 9/2020 | Kim et al. | |
| 2020/0323032 | A1 | 10/2020 | Kim et al. | |
| 2021/0153124 | A1 | 5/2021 | Pandey et al. | |
| 2021/0176117 | A1 | 6/2021 | Zhang et al. | |
| 2022/0015171 | A1 | 1/2022 | Chung et al. | |
| 2022/0053426 | A1 | 2/2022 | Ahn et al. | |
| 2022/0117021 | A1 | 4/2022 | Chung et al. | |
| 2022/0124532 | A1 * | 4/2022 | Rugeland .............. | H04W 76/27 |
| 2023/0188942 | A1 * | 6/2023 | Lee ........................ | H04W 64/00 |
| | | | | 455/41.3 |
| 2024/0422575 | A1 * | 12/2024 | Wu ............... | H04W 36/008355 |
| 2026/0006701 | A1 * | 1/2026 | Casey .................. | H05B 47/115 |

FOREIGN PATENT DOCUMENTS

| | | | |
|---|---|---|---|
| KR | 10-2020-0058070 | A | 5/2020 |
| KR | 10-2020-0073811 | A | 6/2020 |
| KR | 10-2020-0145829 | A | 12/2020 |
| KR | 10-2021-0034187 | A | 3/2021 |

OTHER PUBLICATIONS

Spreadtrum Communications, Consideration on early measurement reporting, R2-1915020, 3GPP TSG-RAN WG2 Meeting #108, Nov. 8, 2019.
OPPO, UE measurement behavior for cell reselection and early measurement reporting, R2-1905587, 3GPP TSG-RAN2#106, Apr. 30, 2019.
Extended European Search Report dated Oct. 28, 2024, issued in European Patent application No. 22867522.9.
3rd Generation Partnership Project; Technical Specification Group Radio Access Network; NR; Radio Resource Control (RRC) protocol specification (Release 17), 3GPP TS 38.331 V17.7.0, Dec. 2023.
International Search Report and Written Opinion dated Oct. 25, 2022, issued in International Application No. PCT/KR2022/009604.

* cited by examiner

100

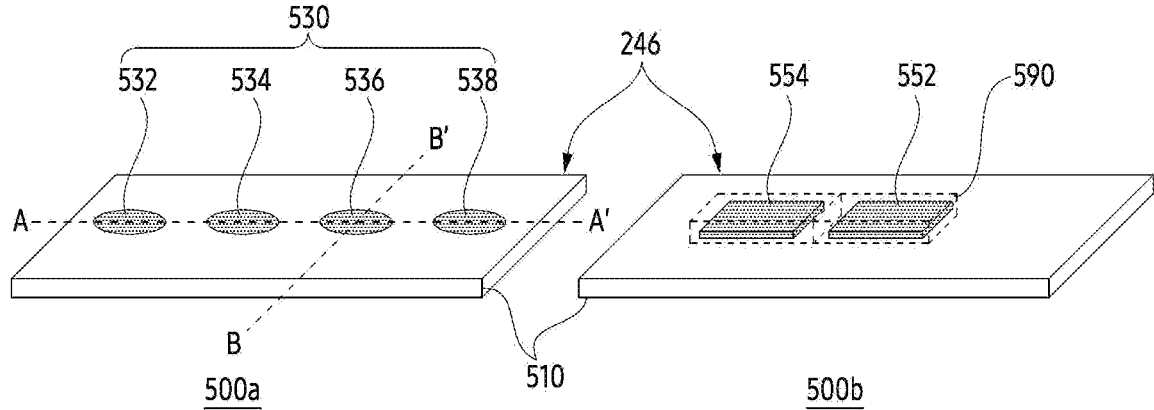
500a          510          500b
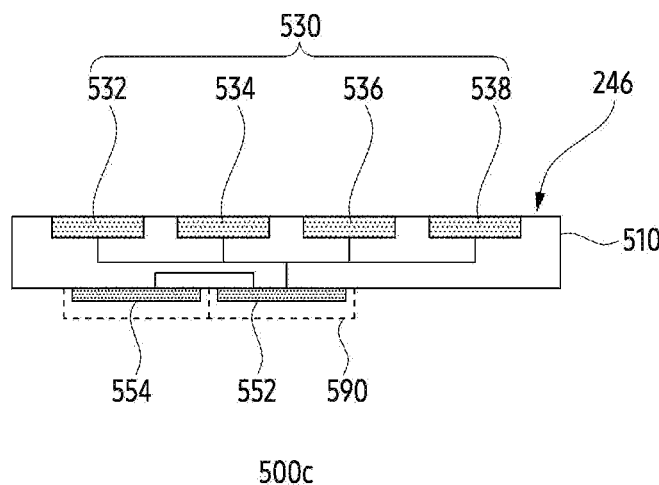
500c
FIG. 5

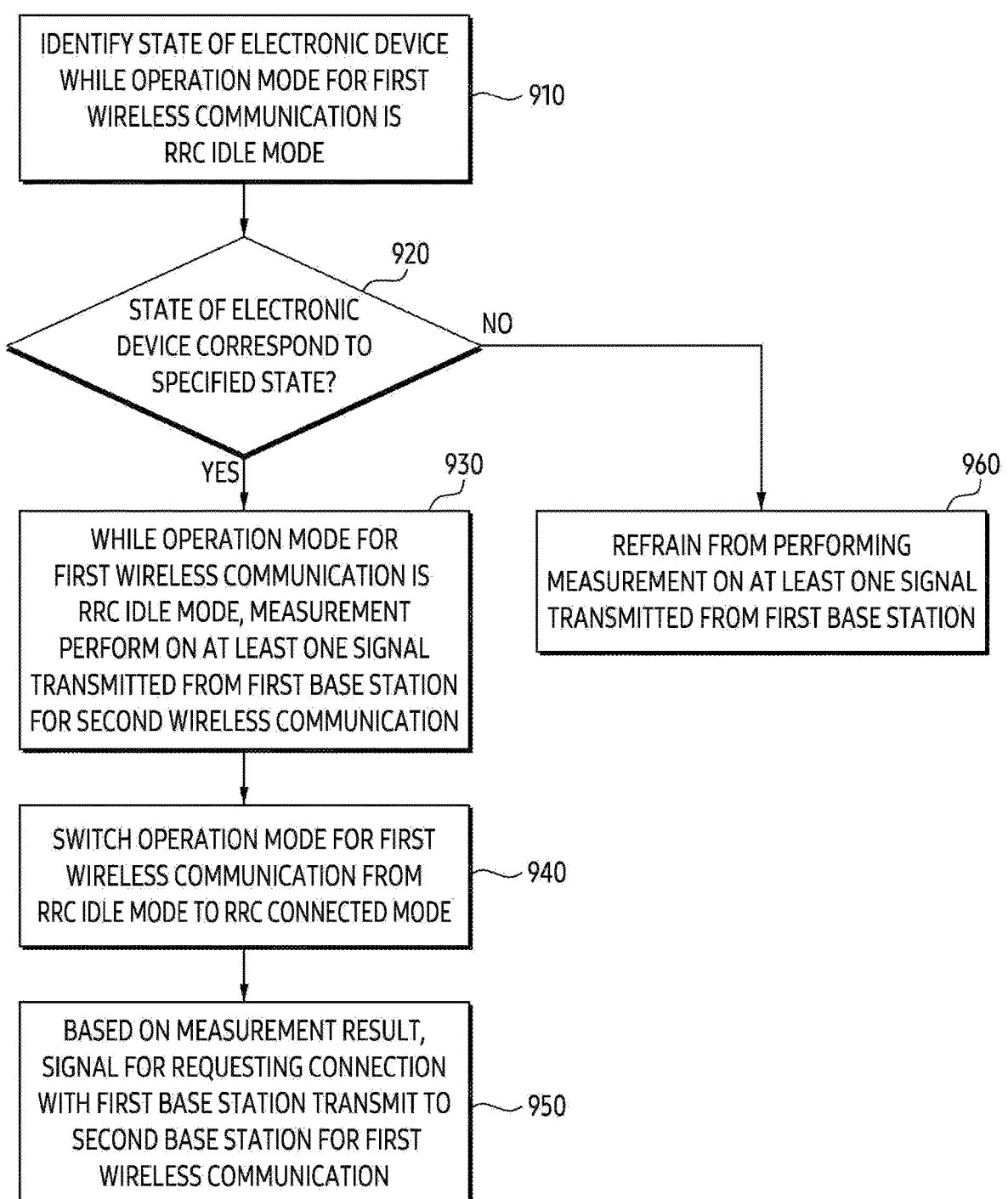

IDENTIFY STATE OF ELECTRONIC DEVICE WHILE OPERATION MODE FOR FIRST WIRELESS COMMUNICATION IS RRC IDLE MODE — 910

STATE OF ELECTRONIC DEVICE CORRESPOND TO SPECIFIED STATE? — 920

NO

YES

WHILE OPERATION MODE FOR FIRST WIRELESS COMMUNICATION IS RRC IDLE MODE, MEASUREMENT PERFORM ON AT LEAST ONE SIGNAL TRANSMITTED FROM FIRST BASE STATION FOR SECOND WIRELESS COMMUNICATION — 930

REFRAIN FROM PERFORMING MEASUREMENT ON AT LEAST ONE SIGNAL TRANSMITTED FROM FIRST BASE STATION — 960

SWITCH OPERATION MODE FOR FIRST WIRELESS COMMUNICATION FROM RRC IDLE MODE TO RRC CONNECTED MODE — 940

BASED ON MEASUREMENT RESULT, SIGNAL FOR REQUESTING CONNECTION WITH FIRST BASE STATION TRANSMIT TO SECOND BASE STATION FOR FIRST WIRELESS COMMUNICATION — 950

FIG. 9

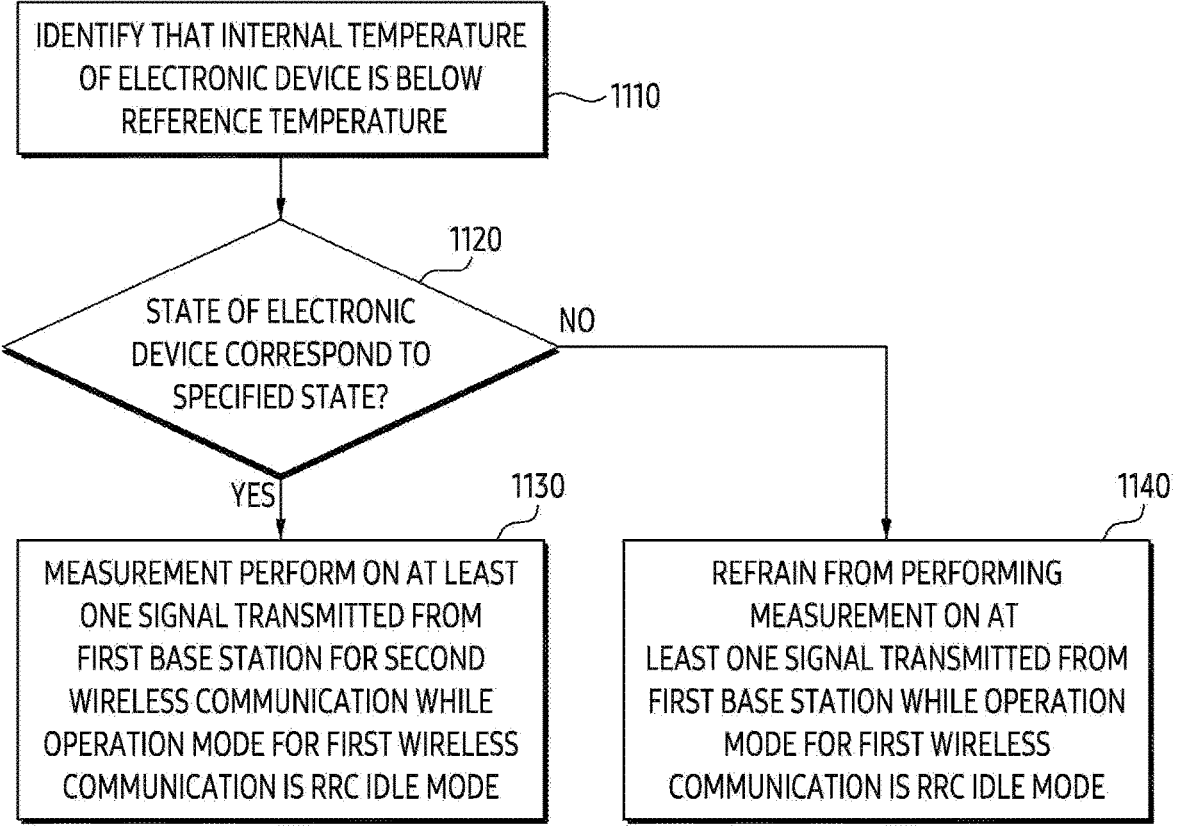

IDENTIFY THAT INTERNAL TEMPERATURE OF ELECTRONIC DEVICE IS BELOW REFERENCE TEMPERATURE —1110

1120

STATE OF ELECTRONIC DEVICE CORRESPOND TO SPECIFIED STATE?

NO

YES

1130

MEASUREMENT PERFORM ON AT LEAST ONE SIGNAL TRANSMITTED FROM FIRST BASE STATION FOR SECOND WIRELESS COMMUNICATION WHILE OPERATION MODE FOR FIRST WIRELESS COMMUNICATION IS RRC IDLE MODE

1140

REFRAIN FROM PERFORMING MEASUREMENT ON AT LEAST ONE SIGNAL TRANSMITTED FROM FIRST BASE STATION WHILE OPERATION MODE FOR FIRST WIRELESS COMMUNICATION IS RRC IDLE MODE

FIG. 11

ELECTRONIC DEVICE, METHOD, AND COMPUTER-READABLE STORAGE MEDIUM FOR OBTAINING INFORMATION ABOUT BASE STATION

CROSS-REFERENCE TO RELATED APPLICATION(S)

This application is a continuation application, claiming priority under § 365(c), of an International application No. PCT/KR2022/009604, filed on Jul. 4, 2022, which is based on and claims the benefit of a Korean patent application number 10-2021-0120704, filed on Sep. 9, 2021, in the Korean Intellectual Property Office, and of a Korean application number 10-2021-0137594, filed on Oct. 15, 2021, in the Korean Intellectual Property Office, the disclosure of which of each is incorporated by reference herein in its entirety.

BACKGROUND

1. Field

The disclosure relates to an electronic device. More particularly, the disclosure relates to a method, and a computer readable storage medium for obtaining information on a base station.

2. Description of Related Art

Efforts are being made to commercialize 5th generation (5G) technology for high-speed, low-latency data transmission and reception. The electronic device may connect to a 5G base station through a long term evolution (LTE) base station. The LTE base station may provide the electronic device with information for connecting to the 5G base station.

The above information is presented as background information only to assist with an understanding of the disclosure. No determination has been made, and no assertion is made, as to whether any of the above might be applicable as prior art with regard to the disclosure.

SUMMARY

In order to connect to the 5G base station, the electronic device may receive information for connecting to the 5G base station from the LTE base station. The electronic device may search for a 5G base station based on information for connection with the 5G base station. Accordingly, a long delay time may occur in a process in which the electronic device receives information for connecting to the 5G base station from the LTE base station and searches for the 5G base station.

Aspects of the disclosure are to address at least the above-mentioned problems and/or disadvantages and to provide at least the advantages described below. Accordingly, an aspect of the disclosure is to provide an electronic device, method, and computer-readable storage medium for obtaining information about base station.

Additional aspects will be set forth in part in the description which follows and, in part, will be apparent from the description, or may be learned by practice of the presented embodiments.

In accordance with an aspect of the disclosure, an electronic device is provided. The electronic device includes a first communication circuit for a first wireless communication, a second communication circuit for a second wireless communication, one or more processors operably coupled with the first communication circuit and the second communication circuit, and memory storing one or more programs including instructions that, when executed by the one or more processors, cause the electronic device to, while an operation mode for the first wireless communication is a radio resource control (RRC) idle mode, identify a state of the electronic device. The at least one processor may be configured to, when the state of the electronic device corresponds to a specified state perform measurement on at least one signal transmitted from a first base station for the second wireless communication while the operation mode is the RRC idle mode, after performing the measurement, switch the operation mode from the RRC idle mode to an RRC connected mode, and within the state in which the operation mode is the RRC connected mode, and based on result of the measurement, transmit a signal for requesting a connection with the first base station to a second base station for the first wireless communication. The at least one processor may be configured to, when the state of the electronic device does not correspond to the specified state, refrain from performing the measurement on the at least one signal transmitted from the first base station.

In accordance with another aspect of the disclosure, a method performed by an electronic device is provided. The method includes, while an operation mode for a first wireless communication is a radio resource control (RRC) idle mode, identifying a state of the electronic device, when the state of the electronic device corresponds to a specified state, performing measurement on at least one signal transmitted from a first base station for a second wireless communication while the operation mode is the RRC idle mode, after performing the measurement, switching the operation mode from the RRC idle mode to an RRC connected mode, and within the state in which the operation mode is the RRC connected mode, based on result of the measurement, transmitting a signal for requesting a connection with the first base station to a second base station for a first wireless communication and, when the state of the electronic device does not correspond to the specified state, refraining from performing the measurement on the at least one signal transmitted from the first base station.

In accordance with another aspect of the disclosure, one or more non-transitory computer-readable storage media storing one or more programs including instructions that, when executed by one or more processors of an electronic device with a first communication circuit for a first wireless communication and a second communication circuit for a second wireless communication, cause the electronic device to perform operations is provided. The operations include, while an operation mode for the first wireless communication is a radio resource control (RRC) idle mode, identifying a state of the electronic device, when the state of the electronic device corresponds to a specified state, performing measurement on at least one signal transmitted from a first base station for the second wireless communication while the operation mode is the RRC idle mode, after performing the measurement, switching the operation mode from the RRC idle mode to an RRC connected mode, and within the state in which the operation mode is the RRC connected mode, based on result of the measurement, transmitting a signal for requesting a connection with the first base station to a second base station for the first wireless communication, and when the state of the electronic device does not correspond to the specified state, refraining from performing the measurement on the at least one signal transmitted from the first base station.

The electronic device can perform the measurement at least one signal transmitted from the first base station, when the state of the electronic device corresponds to the specified state. Accordingly, the electronic device can reduce current consumption by performing measurement in a specified state.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates an embodiment of a structure of a third antenna module described with reference to FIG. 2 according to an embodiment of the disclosure;

FIG. 9 is a flowchart illustrating an operation of an electronic device according to an embodiment of the disclosure;

FIG. 11 is another flowchart illustrating an operation of an electronic device according to an embodiment of the disclosure;

The same reference numerals are used to represent the same elements throughout the drawings.

DETAILED DESCRIPTION

Figure 1:
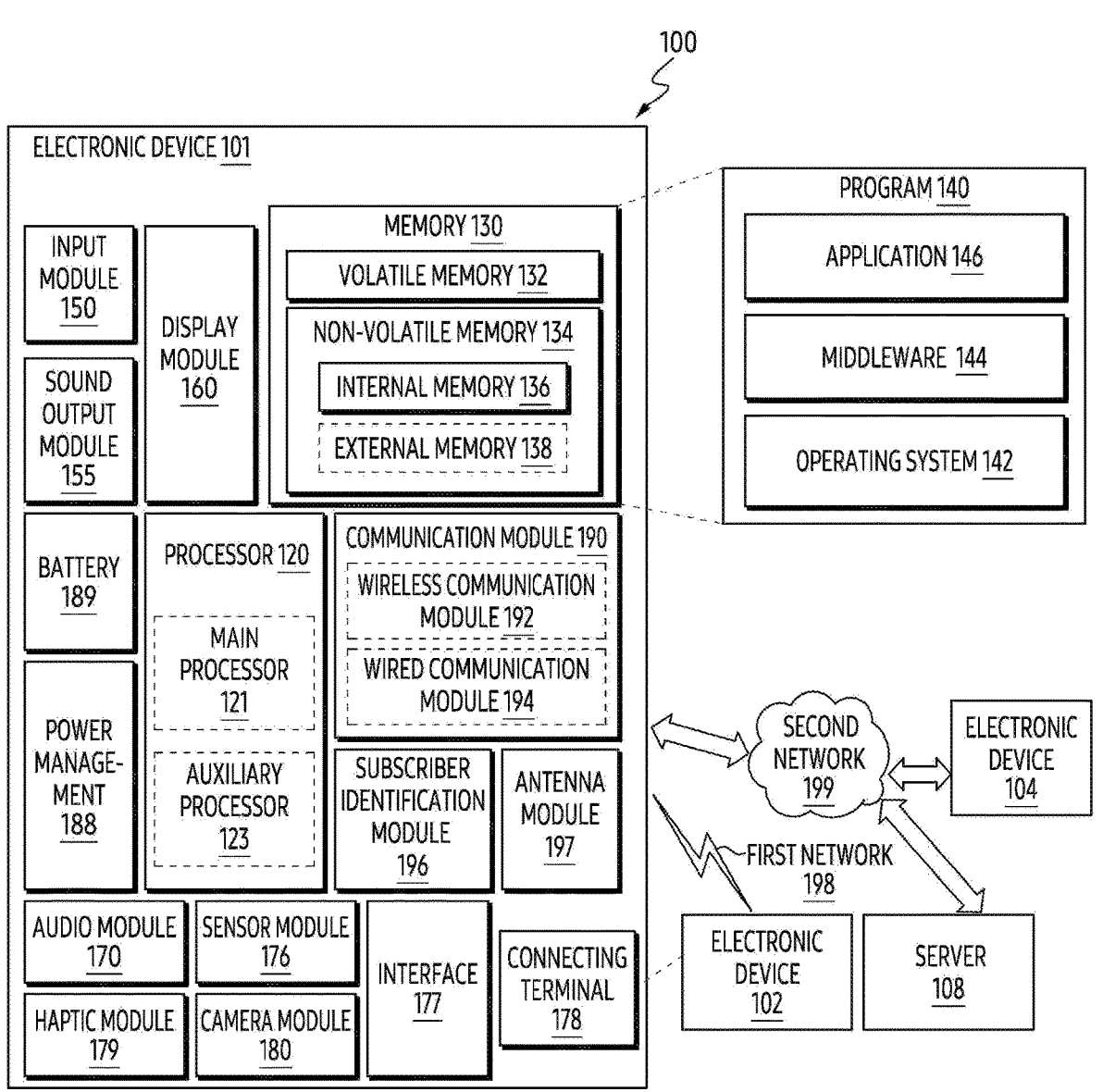
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

It should be appreciated that the blocks in each flowchart and combinations of the flowcharts may be performed by one or more computer programs which include instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphical processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

FIG. 1 is a block diagram illustrating an electronic device 101 in a network environment 100 according to an embodi-ment of the disclosure.

Referring to FIG. 1, the electronic device 101 in the network environment 100 may communicate with an elec-tronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identifica-tion module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be imple-mented as a single component (e.g., the display module 160).

The processor 120 may execute, for example, software (e.g., a program 140) to control at least one other component (e.g., a hardware or software component) of the electronic device 101 coupled with the processor 120, and may per-form various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the commu-nication module 190) among the components of the elec-tronic device 101, instead of the main processor 121 while the main processor 121 is in an inactive (e.g., sleep) state, or together with the main processor 121 while the main pro-cessor 121 is in an active state (e.g., executing an applica-tion). According to an embodiment, the auxiliary processor 123 (e.g., an image signal processor or a communication processor) may be implemented as part of another compo-nent (e.g., the camera module 180 or the communication module 190) functionally related to the auxiliary processor 123. According to an embodiment, the auxiliary processor 123 (e.g., the neural processing unit) may include a hard-ware structure specified for artificial intelligence model processing. An artificial intelligence model may be gener-ated by machine learning. Such learning may be performed, e.g., by the electronic device 101 where the artificial intel-ligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
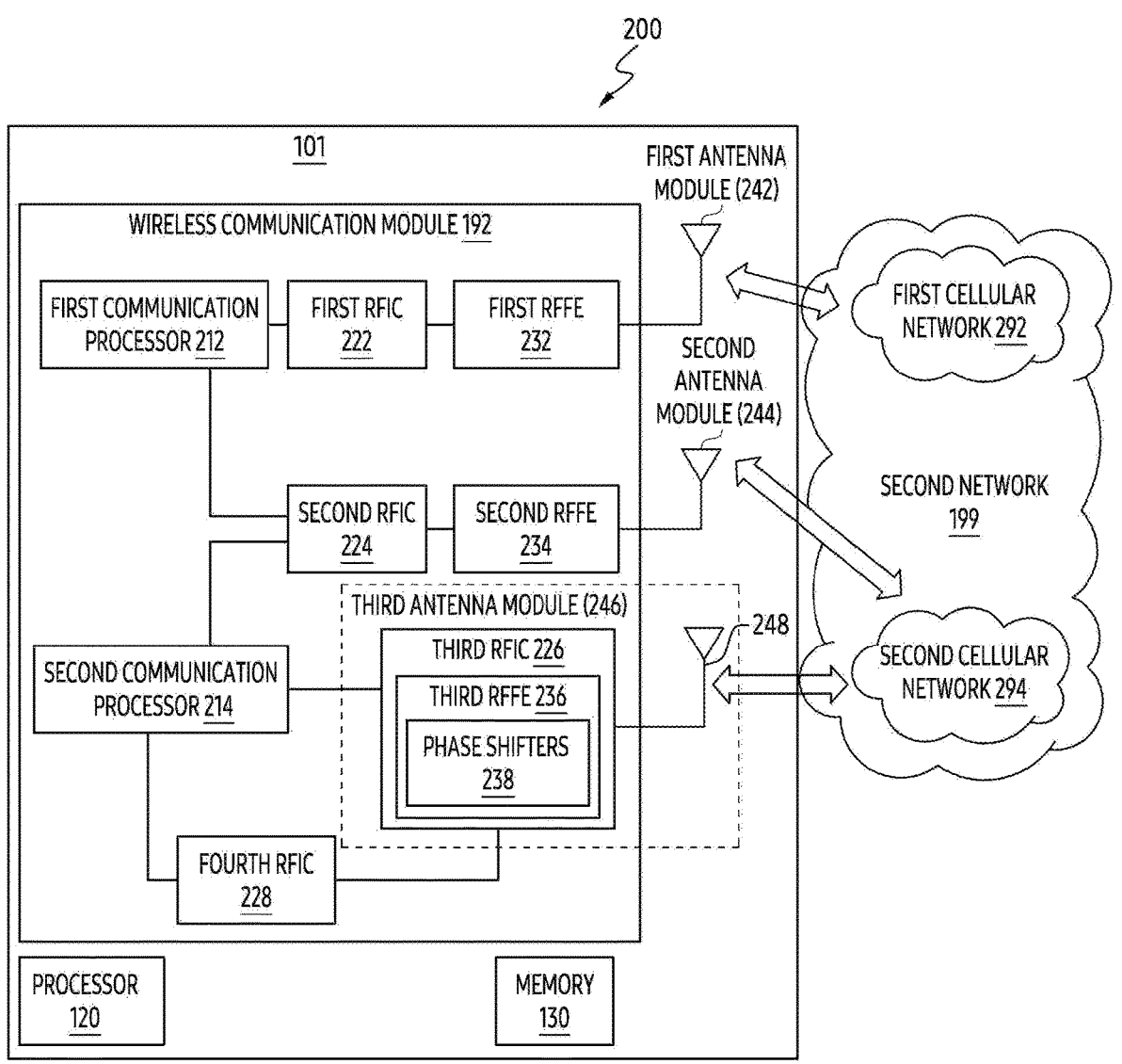
FIG. 2 is a block diagram of an electronic device for supporting legacy network communication and 5G network communication according to an embodiment of the disclosure.

FIG. 2 is a block diagram 200 of the electronic device 101 for supporting legacy network communication and 5G network communication, according to an embodiment of the disclosure.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to various embodiments, the first cellular network 292 may be a legacy network including a $2^{nd}$ generation (2G), $3^{rd}$ generation (3G), $4^{th}$ generation (4G), and/or long-term evolution (LTE) network. The second communication processor 214 may support the establishment of a communication channel corresponding to a specified band (e.g., approximately 6 gigahertz (GHz) to 60 GHz) among bands to be used for wireless communication with the second cellular network 294, and 5G network communication through the established communication channel. According to various embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to various embodiments, the first communication processor 212 or the second communication processor 214 may be formed with the processor 120, the auxiliary processor 123 of FIG. 1, or the communication module 190 in a single chip or a single package.

Upon transmission, the first RFIC 222 may convert a baseband signal generated by the first communication processor 212 into a radio frequency (RF) signal of approximately 700 megahertz (MHz) to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
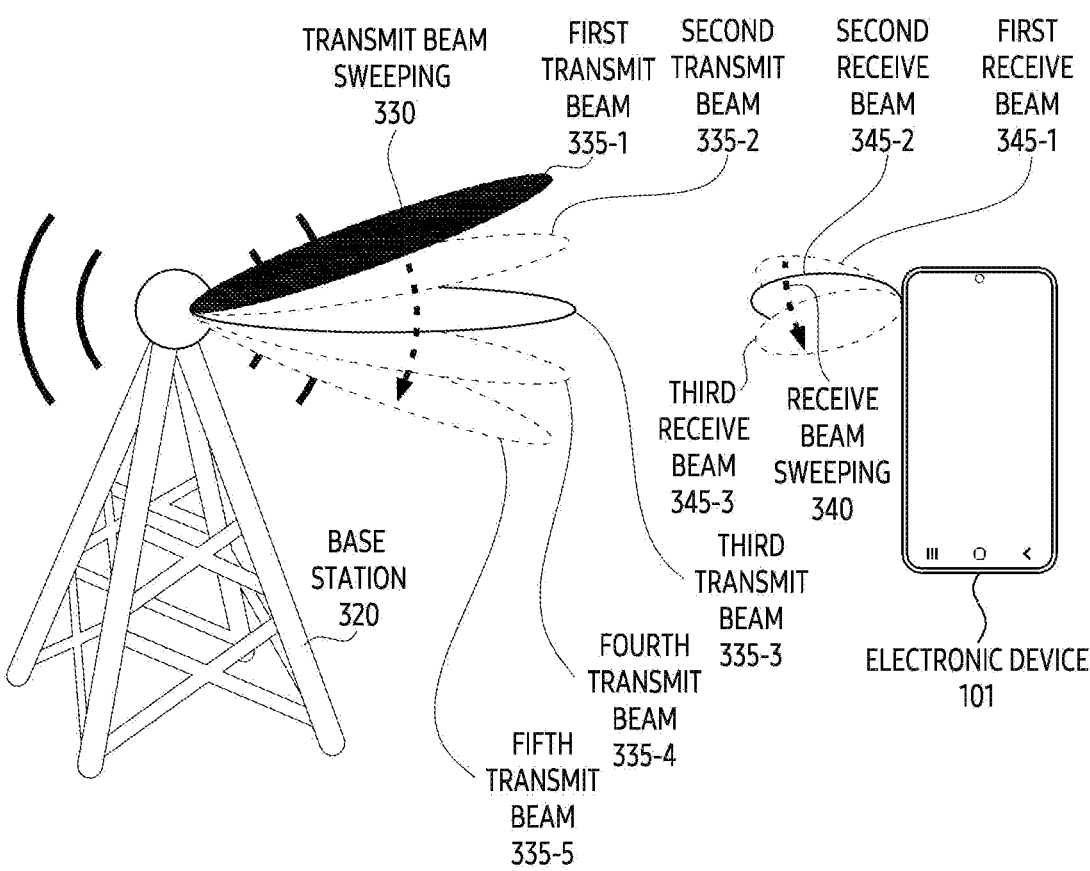
FIG. 3 illustrates an embodiment of an operation for wireless communication connection between a base station and an electronic device in a second network (e.g., a 5G network) of FIG. 2 using a directional beam for wireless connection according to an embodiment of the disclosure.

FIG. 3 illustrates an embodiment of an operation for wireless communication connection between a base station 320 and the electronic device 101 by using a directional beam for wireless connection in the second cellular network 294 (e.g., the 5G network) of FIG. 2 according to an embodiment of the disclosure.

First, the base station (gNodeB (gNB), transmission reception point (TRP)) 320 may perform a beam detection operation with the electronic device 101 for wireless communication connection. In the illustrated embodiment, for beam detection, the base station 320 may sequentially transmit a plurality of transmit beams, for example, first to fifth transmit beams 335-1 to 335-5 having different directions, thereby making it possible to perform at least one transmit beam sweeping 330.

The first to fifth transmit beams 335-1 to 335-5 may include at least one synchronization sequences (SS)/physical broadcast channel (PBCH) block (SS/PBCH Block). The SS/PBCH Block may be used to periodically measure a channel or beam strength of the electronic device 101.

In another embodiment, the first to fifth transmit beams 335-1 to 335-5 may include at least one channel state information-reference signal (CSI-RS). The CSI-RS is a reference signal that the base station 320 may set flexibly and may be transmitted periodically, semi-persistently or aperiodically. The electronic device 101 may measure a channel or beam strength by using the CSI-RS.

The transmit beams may form a radiation pattern having a selected beam width. For example, the transmit beams may have a broad radiation pattern having a first beam width or a sharp radiation pattern having a second beam width shaper than the first beam width. For example, transmit beams including SS/PBCH block may have a broader radiation pattern than transmit beams including CSI-RS.

The electronic device 101 may perform receive beam sweeping 340 while the base station 320 performs the transmit beam sweeping 330. For example, while the base station 320 performs first transmit beam sweeping 330, the electronic device 101 may fix a first receive beam 345-1 in a first direction to receive a signal of an SS/PBCH block transmitted in at least one of the first to fifth transmit beams 335-1 to 335-5. While the base station 320 performs second transmit beam sweeping 330, the electronic device 101 may fix a second receive beam 345-2 in a second direction to receive a signal of an SS/PBCH block transmitted in the first to fifth transmit beams 335-1 to 335-5. In this way, the electronic device 101 may select a communicable receive beam (e.g., the second receive beam 345-2) and a communicable transmit beam (e.g., the third transmit beam 335-3) based on the result of the signal reception operation through the receive beam sweeping 340.

As described above, after the communicable transmit and receive beams are determined, the base station 320 and the electronic device 101 may transmit and/or receive basic information for cell setting, and based on the information, set information for additional beam operation. For example, the beam operation information may include detailed information on a set beam, SS/PBCH Block, CSI-RS, or setting information on an additional reference signal.

In addition, the electronic device 101 may continuously monitor the channel and the strength of the beam by using at least one of the SS/PBCH Block and CSI-RS included in the transmit beam. The electronic device 101 may adaptively select a beam having good beam quality by using the monitoring operation. Optionally, when a communication is disconnected due to movement of the electronic device 101 or blocking of a beam, the above-mentioned beam sweeping operation may be performed again to determine a communicable beam.

Figure 4:
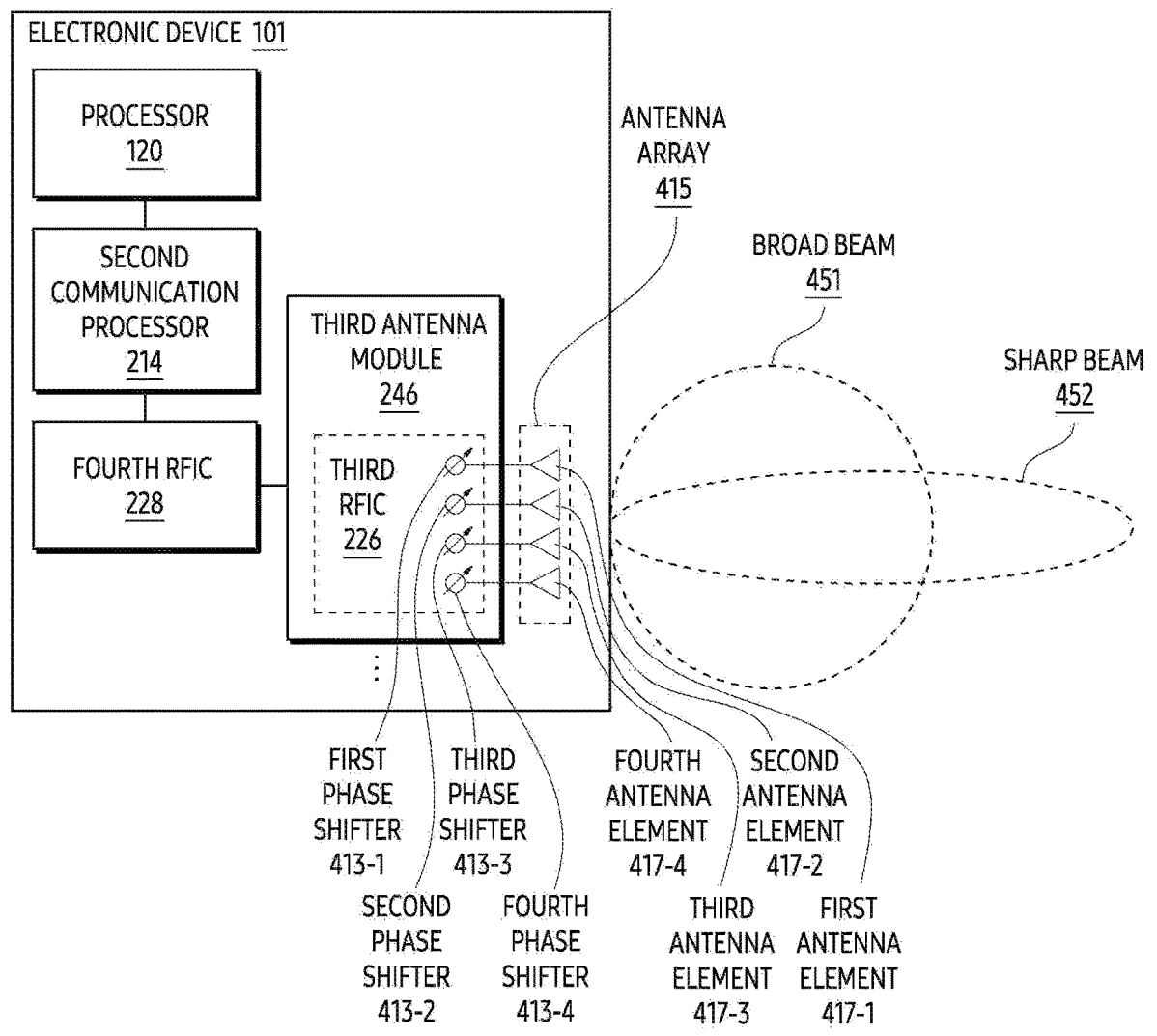
FIG. 4 is a block diagram of an electronic device for 5G network communication according to an embodiment of the disclosure.

FIG. 4 illustrates a block diagram of the electronic device 101 for 5G network communication, according to an embodiment of the disclosure.

The electronic device 101 may include various components illustrated in FIG. 2; however, for brief description, FIG. 4 illustrates the electronic device 101 as including the processor 120, the second communication processor 214, the fourth RFIC 228, and at least one third antenna module 246.

In the illustrated embodiment, the third antenna module 246 may include first to fourth phase shifters 413-1 to 413-4 (e.g., the phase shifter 238 in FIG. 2) and/or first to fourth antenna elements 417-1 to 417-4 (e.g., the antenna 248 in FIG. 2). Each of the first to fourth antenna elements 417-1 to 417-4 may be electrically connected to one of the first to fourth phase shifters 413-1 to 413-4 individually. The first to fourth antenna elements 417-1 to 417-4 may form at least one antenna array 415.

The second communication processor 214 may control the first to fourth phase shifters 413-1 to 413-4, thereby controlling the phases of the transmitted and/or received signals through the first to fourth antenna elements 417-1 to 417-4, which makes it possible to generate a transmit beam and/or a receive beam in a selected direction.

According to an embodiment, the third antenna module 246 may form a broad beam 451 of the broad radiation pattern (hereinafter, referred to as a 'broad beam') or a sharp beam 452 of the sharp radiation pattern (hereinafter, referred to as a 'sharp beam') as mentioned above, depending on the number of the used antenna elements. For example, the third antenna module 246 may form the sharp beam 452 when all of the first to fourth antenna elements 417-1 to 417-4 are used, and form the broad beam 451 when only the first antenna element 417-1 and the second antenna element 417-2 are used. The broad beam 451 has a broader coverage than the sharp beam 452, but has a small antenna gain, and thus it may be more effective in searching for a beam. On the other hand, the sharp beam 452 has a narrower coverage than the broad beam 451, but has a higher antenna gain, and thus it may improve communication performance.

According to an embodiment the second communication processor 214 may utilize a sensor module 176 (e.g., a 9-axis sensor, grip sensor, or GPS) for beam search. For example, the electronic device 101 may adjust a beam search position and/or a beam search period based on the position and/or movement of the electronic device 101 by using the sensor module 176. For another example, when the electronic device 101 is gripped by a user, an antenna module having better communication performance may be selected from among the plurality of third antenna modules 246 by identifying the gripping part of the user using a grip sensor.

FIG. 5 illustrates, for example, an embodiment of a structure of the third antenna module 246 described with reference to FIG. 2 according to an embodiment of the disclosure. Referring to 500a of FIG. 5 is a perspective view of the third antenna module 246 as viewed from one side, and referring to 500b of FIG. 5 is a perspective view of the third antenna module 246 as viewed from the other side. Referring to 500c of FIG. 5 is a cross-sectional view of A-A' of the third antenna module 246.

Referring to FIG. 5, in an embodiment, the third antenna module 246 may include a printed circuit board 510, an antenna array 530, a radio frequency integrated circuit (RFIC) 552, and a power manage integrated circuit (PMIC) 554, and a module interface (not shown). The third antenna module 246 may further optionally include a shielding member 590. In other embodiments, at least one of the aforementioned parts may be omitted, or at least two of the parts may be integrally formed.

The printed circuit board 510 may include a plurality of conductive layers and a plurality of non-conductive layers alternately stacked with the conductive layers. The printed circuit board 510 may provide electrical connection between various electronic components disposed on the printed circuit board 510 and/or outside, by using wires and conductive vias formed on the conductive layer.

The antenna array 530 (e.g., 248 in FIG. 2) may include a plurality of antenna elements 532, 534, 536, and 538 arranged to form a directional beam. The antenna elements may be formed on a first surface of the printed circuit board 510 as illustrated. According to another embodiment, the antenna array 530 may be formed inside the printed circuit board 510. According to embodiments, the antenna array 530 may include a plurality of antenna arrays (e.g., a dipole antenna array and/or a patch antenna array) of the same or different shape or type.

The RFIC 552 (e.g., the third RFIC 226 in FIG. 2) may be disposed in another region of the printed circuit board 510 (e.g., a second surface opposite to the first surface), spaced apart from the antenna array 530. The RFIC 552 may be configured to process a signal of a selected frequency band that is transmitted and received via the antenna array 530. According to an embodiment, upon transmission, the RFIC 552 may convert a baseband signal obtained from a communication processor (not illustrated) into an RF signal of a specified band. Upon reception, the RFIC 552 may convert an RF signal received via the antenna array 530 into a baseband signal and transmit the converted signal to the communication processor.

According to another embodiment, upon transmission, the RFIC 552 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 552 may down-convert the RF signal obtained via the antenna array 530 into an IF signal, and transmit the converted signal to the IFIC.

The PMIC 554 may be disposed in another partial region (e.g., the second surface) of the printed circuit board 510, spaced apart from the antenna array. The PMIC 554 may receive a voltage from a main PCB (not shown) and provide power required for various components (e.g., the RFIC 552) on antenna modules.

The shielding member 590 may be disposed on a part (e.g., the second surface) of the printed circuit board 510 in order to electromagnetically shield at least one of the RFIC 552 and the PMIC 554. According to an embodiment, the shielding member 590 may include a shield can.

Although not illustrated, in various embodiments, the third antenna module 246 may be electrically connected to another printed circuit board (e.g., the main circuit board) through the module interface. The module interface may include a connection member, for example, a coaxial cable connector, a board to board connector, an interposer, or a flexible printed circuit board (FPCB). Using the connection member, the RFIC 552 and/or the PMIC 554 of the third antenna module 246 may be electrically connected to the printed circuit board.

Figure 6:
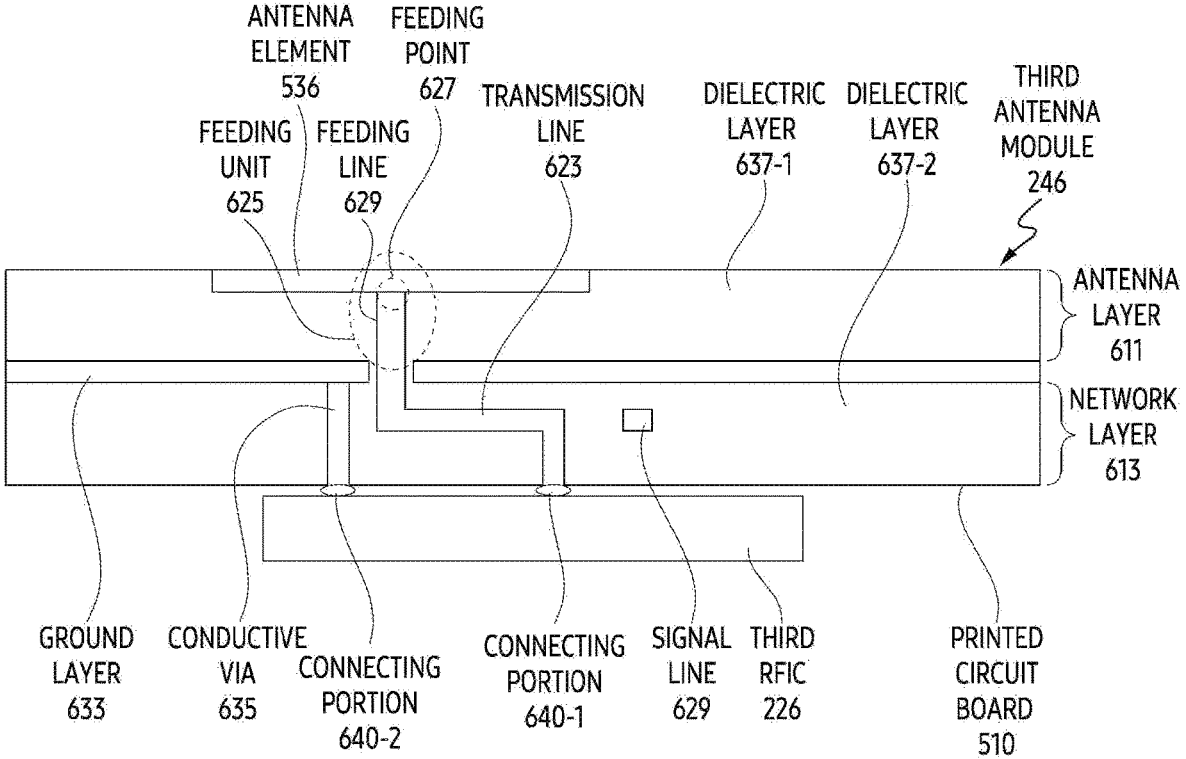
FIG. 6 illustrates a cross-sectional view of line B-B' of the third antenna module of 500A of FIG. 5A according to an embodiment of the disclosure.

FIG. 6 illustrates a cross-section taken along line B-B' of the third antenna module 246 of 400a of FIG. 5 according to an embodiment of the disclosure.

A printed circuit board 510 of the illustrated embodiment may include an antenna layer 611 and a network layer 613.

The antenna layer 611 may include at least one dielectric layer 637-1, and an antenna element 536 and/or a feeding unit 625 formed on the outer surface of or inside of the dielectric layer. The feeding unit 625 may include a feeding point 627 and/or a feeding line 629.

The network layer 613 may include at least one dielectric layer 637-2, at least one ground layer 633 formed on the outer surface of or inside of the dielectric layer, at least one conductive via 635, a transmission line 623, and/or a signal line 626.

In addition, in the illustrated embodiment, the third RFIC 226 may be electrically connected to the network layer 613, for example, through first and second connecting portions (solder bumps) 640-1 and 640-2. In other embodiments, various connecting structures (e.g., solder or ball grid array (BGA)) may be used instead of the connecting portions. The third RFIC 226 may be electrically connected to the antenna element 536 via a first connecting portion 640-1, the transmission line 623, and the feeding unit 625. The third RFIC 226 may also be electrically connected to the ground layer 633 via the second connecting portion 640-2 and the conductive via 635. Although not illustrated, the third RFIC 226 may also be electrically connected to the module interface mentioned above via the signal line 626.

Figure 7A:
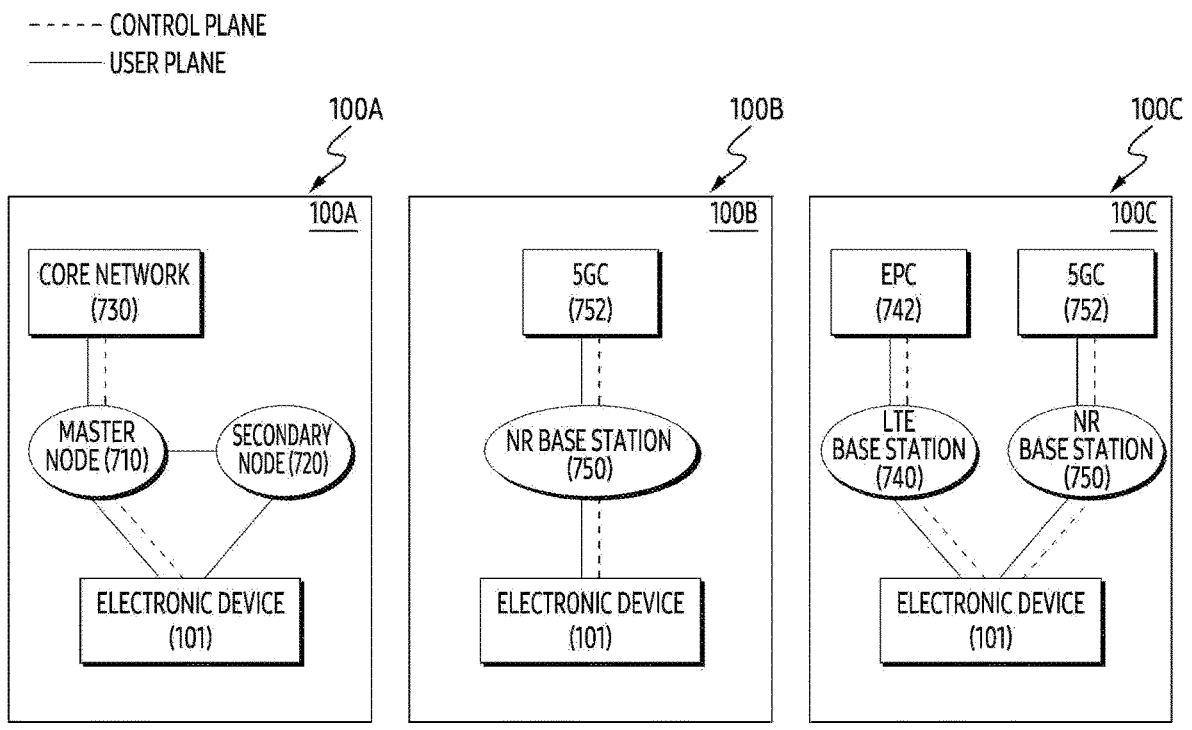
FIG. 7A illustrates wireless communication systems that provide a network of legacy communication and/or 5G communication according to an embodiment of the disclosure.

FIG. 7A illustrates wireless communication systems that provide a network of legacy communication and/or 5g communication according to an embodiment of the disclosure.

Referring to FIG. 7A, network environments 100a, 100b, and 100c may include at least one of a legacy network and a 5G network. The legacy network may include, for example, a 4G or LTE base station 740 (e.g., eNodeB (eNB)) of a 3GPP standard supporting wireless access with the electronic device 101 and an evolved packet core (EPC) 742 managing 4G communication. The 5G network may include, for example, a New Radio (NR) base station 750 (e.g., gNodeB (gNB)) supporting wireless access with the electronic device 101 and a 5th generation core (5GC) 752 managing 5G communication of the electronic device 101.

According to various embodiments, the electronic device 101 may transmit and receive a control message and user data through legacy communication and/or 5G communication. The control message may include, for example, a message related to at least one of security control, bearer setup, authentication, registration, or mobility management of the electronic device 101. The user data may refer to, for example, user data excluding a control message transmitted and received between the electronic device 101 and the core network 730 (e.g., EPC 742).

Referring to reference number 700A, the electronic device 101 according to an embodiment may transmit and receive at least one of a control message or user data to and from at least a portion (e.g., NR base station 750 and 5GC 752) of the 5G network, using at least a portion (e.g., LTE base station 740 and EPC 742) of the legacy network.

According to various embodiments, the network environment 100A may provide wireless communication dual connectivity MR-DC (multi-RAT (radio access technology) dual connectivity) to the LTE base station 740 and the NR base station 750, and may include a network environment for transmitting and receiving a control message to and from the electronic device 101 through the core network 730 of one of EPC 742 or 5GC 752.

According to various embodiments, in the MR-DC environment, one base station among LTE base station 740 or NR base station 750 may operate as a master node (MN) 710 and the other may operate as a secondary node (SN) 720. The MN 710 may be connected to the core network 730 to transmit and receive a control message. The MN 710 and the SN 720 may be connected through a network interface to transmit and receive messages related to radio resource (e.g., communication channel) management with each other.

According to various embodiments, the MN 710 may be configured to an LTE base station 740, the SN 720 may be configured to an NR base station 750, and the core network (730) may be configured to an EPC 742. For example, a control message may be transmitted and received through the LTE base station 740 and the EPC 742, and user data may be transmitted and received through the LTE base station 740 and the NR base station 750.

Referring to reference number 700B, according to various embodiments, the 5G network may independently transmit and receive a control message and user data to and from the electronic device 101.

Referring to reference number 700C, the legacy network and the 5G network according to various embodiments may independently provide data transmission and reception. For example, the electronic device 101 and the EPC 742 may transmit and receive a control message and user data through the LTE base station 740. As another example, the electronic device 101 and the 5GC 752 may transmit and receive a control message and user data through the NR base station 750.

According to various embodiments, the electronic device 101 may be registered in at least one of the EPC 742 or the 5GC 752 to transmit and receive a control message.

According to various embodiments, the EPC 742 or the 5GC 752 may manage communication of the electronic device 101 by interworking with each other. For example, movement information of the electronic device 101 may be transmitted and received through an interface between the EPC 742 and the 5GC 752.

Figure 7B:
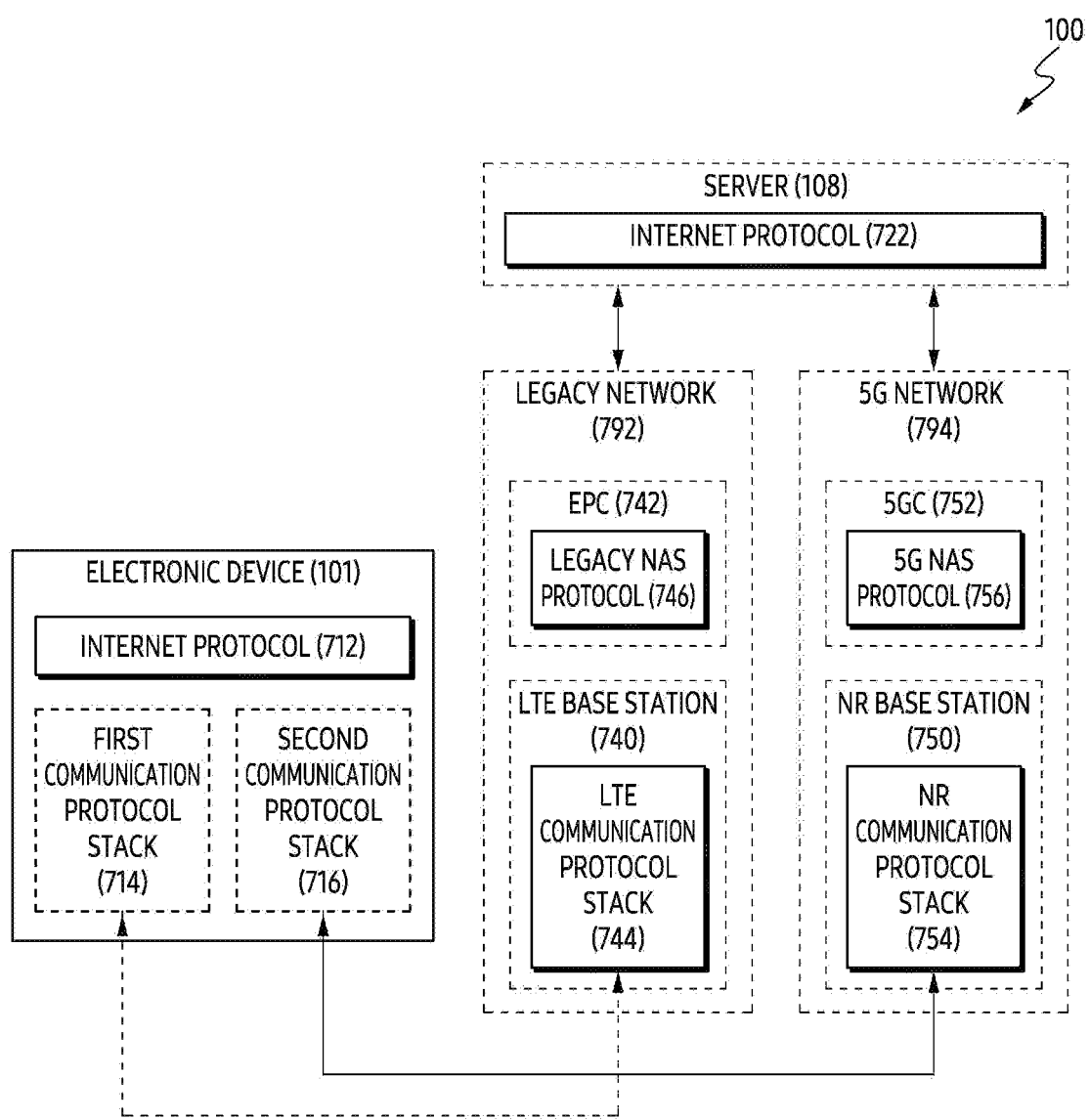
FIG. 7B is a diagram illustrating a protocol stack structure of a network of legacy communication and/or 5G communication according to an embodiment of the disclosure.

FIG. 7B is a diagram illustrating a protocol stack structure of a network 100 of legacy communication and/or 5G communication according to an embodiment of the disclosure.

Referring to FIG. 7B, the network 100 according to the illustrated embodiment may include an electronic device 101, a legacy network 792, a 5G network 794, and a server 108.

The electronic device 101 may include an Internet protocol (IP) 712, a first communication protocol stack 714, and a second communication protocol stack 716. The electronic device 101 may communicate with the server 108 through the legacy network 792 and/or the 5G network 794.

According to an embodiment, the electronic device 101 may perform Internet communication associated with the server 108 using an Internet protocol 712 (e.g., transmission control protocol (TCP), user datagram protocol (UDP), and IP). The Internet protocol 712 may be executed, for example, in a main processor (e.g., the main processor 121 of FIG. 1) included in the electronic device 101.

According to another embodiment, the electronic device 101 may wirelessly communicate with the legacy network 792 using the first communication protocol stack 714. According to another embodiment, the electronic device 101 may wirelessly communicate with the 5G network 794 using the second communication protocol stack 716. The first communication protocol stack 714 and the second communication protocol stack 716 may be executed, for example, in one or more communication processors (e.g., wireless communication module 192 of FIG. 1) included in the electronic device 101.

The server 108 may include an Internet protocol 722. The server 108 may transmit and receive data related to the Internet protocol 722 to and from the electronic device 101 through the legacy network 792 and/or the 5G network 794. According to an embodiment, the server 108 may include a cloud computing server existing outside the legacy network 792 or the 5G network 794. In another embodiment, the server 108 may include an edge computing server (or a mobile edge computing (MEC) server) located inside at least one of the legacy network 792 or the 5G network 794.

The legacy network 792 may include an LTE base station 740 and an EPC 742. The LTE base station 740 may include an LTE communication protocol stack 744. The EPC 742 may include a legacy NAS protocol 746. The legacy network 792 may perform LTE wireless communication with the electronic device 101 using the LTE communication protocol stack 744 and the legacy NAS protocol 746.

The 5G network 794 may include an NR base station 750 and a 5GC 752. The NR base station 750 may include an NR communication protocol stack 754. The 5GC 752 may include a 5G NAS protocol 756. The 5G network 794 may perform NR wireless communication with the electronic device 101 using the NR communication protocol stack 754 and the 5G NAS protocol 756.

According to an embodiment, the first communication protocol stack 714, the second communication protocol stack 716, the LTE communication protocol stack 744, and the NR communication protocol stack 754 may include a control plane protocol for transmitting and receiving control messages and a user plane protocol for transmitting and receiving user data. The control message may include, for example, a message related to at least one of security control, bearer settings, authentication, registration, or mobility management. The user data may include, for example, remaining data except for the control message.

According to an embodiment, the control plane protocol and the user plane protocol may include physical (PHY), medium access control (MAC), radio link control (RLC), or packet data convergence protocol (PDCP) layers. For example, after channel coding and modulating data received from an upper layer (e.g., a MAC layer), the PHY layer may transmit the data which is channel coded and modulated to a wireless channel and may demodulate and decode data received through the wireless channel and transmit the data to the upper layer. The PHY layer included in the second communication protocol stack 716 and the NR communication protocol stack 754 may further perform an operation related to beam forming. The MAC layer, for example, may logically or physically map data and a wireless channel to transmit and receive the data and perform a hybrid automatic repeat request (HARQ) for error correction. The RLC layer may perform, for example, concatenation, segmentation, or reassembly of data, and order verification, rearrangement, or redundancy verification of data. The PDCP layer may perform, for example, operations related to ciphering of control data and user data, and data integrity. The second communication protocol stack 716 and the NR communication protocol stack 754 may further include a service data adaptation protocol (SDAP). The SDAP may manage, for example, wireless bearer allocation based on quality of service (QoS) of user data.

According to various embodiments, the control plane protocol may include a radio resource control (RRC) layer and a Non-Access Stratum (NAS) layer. The RRC layer may process, for example, control data related to wireless bearer setting, paging, or mobility management. The NAS may process, for example, a control message related to authentication, registration, and/or mobility management.

According to an embodiment, while communicating through the first wireless communication, the processor (e.g., the processor 120 of FIG. 1) of the electronic device (e.g., the electronic device 101 of FIG. 1) may change the communication method from the first wireless communication to the second wireless communication. For example, the processor may establish a connection with the first base station for second wireless communication. For example, the processor may change the connection state of the electronic device from a state connected to the second base station (e.g., LTE base station) to a state connected to the first base station (e.g., 5G base station).

For example, while the operation mode for the first wireless communication is a radio resource control (RRC) idle mode (or idle state), the processor may measure a signal transmitted (or sent) from the first base station for the second wireless communication. After the operation mode for the first wireless communication is changed from the RRC idle mode to the RRC connected mode, based on the result of the measurement, the process may transmit a signal for requesting connection with the first base station to the second base station. The processor may receive information on the first base station from the second base station. The processor may establish a connection with the first base station based on the information on the first base station.

The RRC idle mode or RRC connected mode described below may mean an operating state of an electronic device related to RRC or at least one operation performed in the operating state.

For example, the RRC idle mode may mean that the electronic device is in an RRC idle state with respect to wireless communication (e.g., first wireless communication or second wireless communication), or may mean at least one operation performed in the RRC idle state. For example, that the operation mode is the RRC idle mode may mean that the electronic device is in the RRC idle state.

For example, the RRC connection mode may mean that the electronic device is in an RRC-connected state with respect to wireless communication (e.g., first wireless communication or second wireless communication) or at least one operation performed when the electronic device is in an RRC connected state. For example, that the operation mode is the RRC connected mode may mean that the electronic device is in the RRC idle state.

An operation of a specific electronic device (or a processor of the electronic device) for the above-described embodiment may be described below. The electronic device described below may correspond to the electronic device 101 of FIG. 1.

Figure 8:
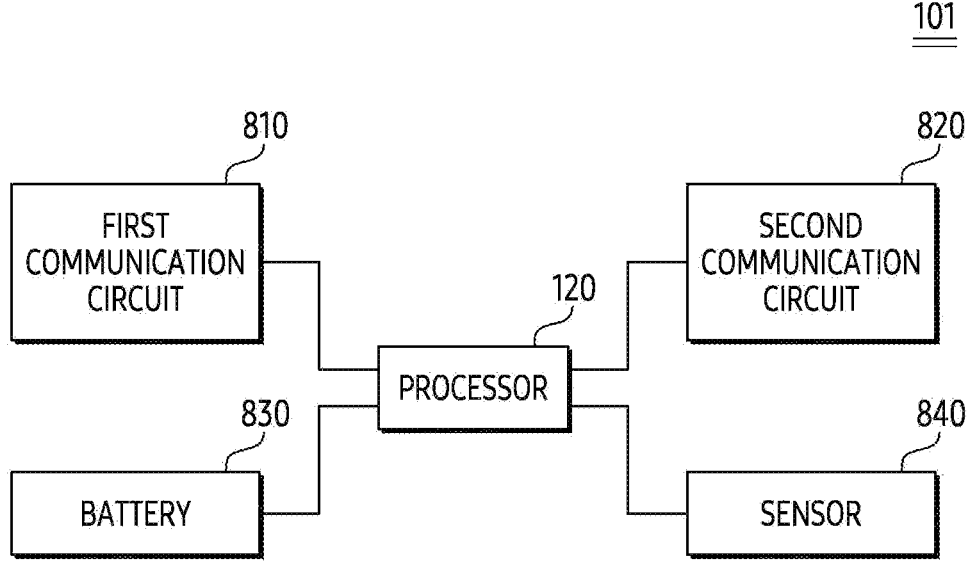
FIG. 8 is a simplified block diagram of an electronic device according to an embodiment of the disclosure.

FIG. 8 is a simplified block diagram of an electronic device according to an embodiment of the disclosure.

Referring to FIG. 8, the electronic device 101 of FIG. 8 may correspond at least partially to the electronic device 101 of FIG. 1. The electronic device 101 may be a terminal that is owned by a user. The terminal may include, for example, a personal computer (PC) such as a laptop and a desktop, and a smartphone, a smart pad, a tablet PC, smart accessories such as a smartwatch and a head-mounted device (HMD).

The electronic device 101 may include a processor 120, a first communication circuit 810, a second communication circuit 820, a battery 830, and/or a sensor 840. According to an embodiment, the electronic device 101 may include at least one of a processor 120, a first communication circuit 810, a second communication circuit 820, a battery 830, and a sensor 840. For example, at least some of the processor 120, the first communication circuit 810, the second communication circuit 820, the battery 830, and the sensor 840 may be omitted according to embodiments.

According to an embodiment, the processor 120 may control the first communication circuit 810, the second communication circuit 820, the battery 830, and the sensor 840. The first communication circuit 810, the second communication circuit 820, the battery 830, and the sensor 840 may be controlled by the processor 120.

Processor 120 may include hardware components for processing data based on one or more instructions. Hardware components for processing data may include, for example, an arithmetical and logic unit (ALU), a field programmable gate (FPGA), and/or a central processing unit (CPU).

The number of processors 120 may be one or more. For example, the processor 120 may have a structure of a multi-core processor such as a dual core, a quad core, or a hexa core.

For example, the processor 120 may include a communication processor (CP). The communication processor may operate to support wireless communication related to one or more functions executed by the processor 120.

The first communication circuit 810 may be used for first wireless communication (e.g., legacy cellular network communication). For example, the processor 120 may communicate with a second base station (e.g., LTE base station) for first wireless communication through the first communication circuit 810.

The second communication circuit 820 may be used for second wireless communication (e.g., 5G network communication). For example, the processor 120 may communicate with a first base station (e.g., a 5G base station) for second wireless communication through the second communication circuit 820.

Although not shown, each of the first communication circuit 810 and the second communication circuit 820 may be connected to at least one antenna. For example, the processor 120 may transmit and/or receive a signal for first wireless communication using at least one antenna connected to the first communication circuit 810. For example, the processor 120 may transmit and/or receive a signal for second wireless communication using at least one antenna connected to the second communication circuit 820.

The battery 830 may be used to supply power to the electronic device 101. The battery 830 may include a rechargeable battery. The processor 120 may identify information on the remaining amount of the battery 830. For example, the processor 120 may identify information on whether the remaining amount of the battery 830 is equal to or greater than the reference residual amount.

The sensor 840 may be used to identify (or obtain) various information about the electronic device 101. The sensor 840 may include at least one sensor. For example, the sensor 840 may include a temperature sensor for identifying information on the internal temperature of the electronic device 101. The processor 120 may identify information on the internal temperature of the electronic device 101 using the sensor 840. For example, the processor 120 may identify information on whether the internal temperature of the electronic device 101 is below the reference temperature using the sensor 840.

FIG. 9 is a flowchart illustrating an operation of an electronic device according to an embodiment of the disclosure.

This method may be executed, for example, by the electronic device 101 and the processor 120 of the electronic device 101 illustrated in FIG. 8.

Referring to FIG. 9, in operation 910, the processor 120 may identify a state of the electronic device 101. The processor 120 may identify the state of the electronic device 101 while the operation mode for the first wireless communication is the RRC idle mode.

According to an embodiment, the processor 120 may identify whether the electronic device 101 is in a state capable of measuring at least one signal transmitted from the first base station for second wireless communication.

For example, in order to identify the state of the electronic device 101, the processor 120 may identify information on whether the internal temperature of the electronic device 101 is less than a reference temperature (e.g., 40° C.). The processor 120 may identify the state of the electronic device 101 based on information on whether the internal temperature of the electronic device 101 is less than the reference temperature.

For example, in order to identify the state of the electronic device 101, the processor 120 may identify information on whether the remaining amount of the rechargeable battery of the electronic device 101 is equal to or greater than the reference residual amount. The processor 120 may identify the state of the electronic device 101 based on information on whether the remaining amount of the rechargeable battery of the electronic device 101 is equal to or greater than the reference residual amount.

For example, in order to identify the state of the electronic device 101, the processor 120 may identify information on whether the electronic device 101 is in a low power state (e.g., less than 15% of the remaining power). The processor 120 may identify the state of the electronic device 101 based on information on whether the electronic device 101 is in a low power state.

For example, the processor 120 may identify the state of the electronic device 101, based on at least one of information on whether the internal temperature of the electronic device 101 is less than the reference temperature and information on whether the remaining amount of the rechargeable battery of the electronic device 101 is equal to or greater than the reference residual amount.

According to an embodiment, before performing operation 910, the processor 120 may operate in an RRC-connected state with the second base station. Before performing operation 910, the processor 120 may operate an operation mode for the first wireless communication as an RRC connection mode. The processor 120 may receive a request signal for switching the operation mode for the first wireless communication from the RRC connection mode to the RRC idle mode from the second base station. For example, the processor 120 may receive a RRC release message.

The processor 120 may identify the state of the electronic device 101 while the operation mode for the first wireless communication is the RRC idle mode based on a request signal for switching the operation mode for the first wireless communication from the RRC connection mode to the RRC idle mode. For example, the processor 120 may switch the operation mode for the first wireless communication from the RRC connection mode to the RRC idle mode based on the signal. The processor 120 may identify the state of the electronic device 101 while the operation mode for the first wireless communication is the RRC idle mode.

According to an embodiment, while the operation mode for the first wireless communication is an RRC idle mode, the request signal for switching the operation mode for the first wireless communication from the RRC connection mode to the RRC idle mode may include information for requesting measurement of at least one signal transmitted from the first base station. For example, the second base station may transmit information for requesting the electronic device 101 to perform measurement on at least one signal transmitted from the first base station in the RRC idle mode through a request signal for switching the operation mode from the RRC connection mode to the RRC idle mode. The processor 120 may identify the state of the electronic device 101 based on a request signal for switching the operation mode for the first wireless communication from the RRC connection mode to the RRC idle mode. The processor 120 may measure at least one signal transmitted from the first base station based on the state of the electronic device 101.

In operation 920, the processor 120 may identify whether the state of the electronic device 101 corresponds to a specified state. While the operation mode for the first wireless communication is the RRC idle mode, the processor 120 may identify whether the state of the electronic device 101 corresponds to a specified state.

According to an embodiment, the processor 120 may identify whether the state of the electronic device 101 corresponds to a state capable of measuring at least one signal transmitted from the first base station for second wireless communication.

For example, the processor 120 may identify that the internal temperature of the electronic device 101 is below the reference temperature based on information on whether the internal temperature of the electronic device 101 is below the reference temperature. Based on identifying that the internal temperature of the electronic device 101 is less than the reference temperature, the processor 120 may identify that the state of the electronic device 101 corresponds to the specified state.

For another example, the processor 120 may identify that the remaining amount of the rechargeable battery of the electronic device 101 is equal to or greater than the reference residual amount based on information on whether the remaining amount of the rechargeable battery of the electronic device 101 is equal to or greater than the reference residual amount. Based on identifying that the remaining amount of the rechargeable battery of the electronic device 101 is equal to or greater than the reference residual amount, the processor 120 may identify that the state of the electronic device 101 corresponds to the specified state.

As another example, the processor 120 may identify that the electronic device 101 is in the low power state based on information on whether the electronic device 101 is in the low power state. The processor 120 may identify that the electronic device 101 operates in a low power state. The processor 120 may identify that the state of the electronic device 101 corresponds to a specified state based on identifying that the electronic device 101 is in a low power state.

In operation 930, when the state of the electronic device 101 corresponds to a specified state (e.g., operation 920), while the operation mode for the first wireless communication is the RRC idle mode, the processor 120 may measure at least one signal transmitted (or broadcasted) from the first base station for second wireless communication. While the operation mode for the first wireless communication is the RRC idle mode, based on identifying that the state of the electronic device 101 corresponds to the specified state, the processor 120 may measure at least one signal transmitted from the first base station for second wireless communication.

For example, the first base station may transmit (or broadcast) a synchronization signal/physical broadcast channel (SS/PBCH) block (or a synchronization signal block (SSB)) based on a specified period. The first base station may transmit the SS/PBCH block every specified period. The processor 120 may receive an SS/PBCH block from the first base station. The processor 120 may identify the SS/PBCH block transmitted from the first base station as at least one signal transmitted from the first base station. The processor 120 may identify at least one of a reference signal received power (RSRP), a reference signal received quality (RSRQ), and a received signal strength indicator (RSSI) for the SS/PBCH block.

According to an embodiment, at least one signal transmitted from the first base station may include a signal transmitted within FR (Frequency range) 1 from the first base station and a signal transmitted within FR 2 from the first base station.

For example, the first base station may transmit a signal (or at least one signal) within FR1. The processor 120 may obtain information on FR1 based on a signal transmitted within FR1 from the first base station. The information on FR1 may include information on the quality of a signal transmitted within FR1.

The first base station may transmit a signal (or at least one signal) within FR2. The processor 120 may obtain information on FR2 based on a signal transmitted within FR2 from the first base station. The information on FR2 may include information on the quality of a signal transmitted within FR2.

According to an embodiment, the processor 120 may perform a cell search procedure. The processor 120 may identify at least one signal transmitted from the first base station based on the cell search procedure. The processor 120 may identify at least one signal transmitted from another base station as well as the first base station.

According to an embodiment, the processor 120 may periodically measure at least one signal transmitted from the first base station. The processor 120 may identify the next measurement timing based on the location or movement of the electronic device 101. For example, the processor 120 may change a period of performing measurement on at least one signal transmitted from the first base station. An example of a specific operation of the processor 120 for changing a period of performing measurement on at least one signal transmitted from the first base station will be described later in FIG. 13

In operation 940, the processor 120 may switch the operation mode for the first wireless communication from the RRC idle mode to the RRC connection mode. After performing measurement on at least one signal transmitted from the first base station, the processor 120 may switch the operation mode for the first wireless communication from the RRC idle mode to the RRC connection mode.

According to an embodiment, after performing measurement on at least one signal transmitted from the first base station, the processor 120 may receive a paging message including identification information on the electronic device 101 from the second base station.

For example, traffic (or data) to be transmitted to the electronic device 101 by the second base station may occur. The second base station may transmit a paging message including identification information on the electronic device 101. The processor 120 may receive a paging message including identification information on the electronic device 101. The processor 120 may identify that traffic to be transmitted from the second base station to the electronic device 101 exists based on the paging message.

The processor 120 may perform a random access process with the second base station based on the paging message. For example, the processor 120 may perform a 2-step random access channel (RACH) process with the second base station. For example, the processor 120 may perform 2-step RACH by transmitting the message A to the second base station and receiving the message B. As another example, the processor 120 may perform a 4-step RACH process with the second base station. For example, the processor 120 may perform 4-step RACH by exchanging messages 1 to 4 with the second base station.

Meanwhile, the processor 120 may switch the operation mode for the first wireless communication from the RRC idle mode to the RRC connection mode based on the random access process. The processor 120 may perform an RRC connection procedure with the second base station based on the random access process. The processor 120 may switch the operation mode for the first wireless communication from the RRC idle mode to the RRC connection mode based on the completion of the RRC connection procedure with the second base station.

According to an embodiment, after measuring at least one signal transmitted from the first base station, the processor 120 may identify information on traffic to be transmitted to at least one of the first base station and the second base station. The processor 120 may identify that traffic to be transmitted to at least one of the first base station and the second base station has occurred. The processor 120 may perform a random access process with the second base station based on the information on traffic. The processor 120 may switch the operation mode for the first wireless communication from the RRC idle mode to the RRC connection mode based on the random access process with the second base station.

In operation 950, based on a measurement result of at least one signal transmitted from the first base station, the processor 120 may transmit a signal for requesting connection with the first base station to the second base station for first wireless communication. In a state in which the operation mode for the first wireless communication is the RRC connection mode, the processor 120 may transmit a signal for requesting connection with the first base station to the second base station for first wireless communication, based on the result of measurement of at least one signal transmitted from the first base station.

For example, the processor 120 may transmit a signal for requesting connection with the first base station to the second base station for first wireless communication, based on at least one of traffic information, FR1 information, and FR2 information. For example, the signal for requesting connection with the first base station may be set as one of a signal for requesting connection between the first base station and FR1 and a signal for requesting connection between the first base station and FR2.

For example, the processor 120 may transmit a signal for requesting connection with the first base station to the second base station for first wireless communication, based on at least one of information on the size of traffic to be transmitted, information on throughput required for traffic transmission, information on the intensity of at least one signal transmitted from the first base station, and/or information on priority of traffic to be transmitted.

According to an embodiment, the processor 120 may receive information on the first base station from the second base station based on a signal for requesting connection with the first base station. For example, the information on the first base station may include information for establishing a connection with the first base station. For example, the information on the first base station may include information on a data transmission method through the first wireless communication, information on a beam direction, and/or information on a frequency and bandwidth.

The processor 120 may perform a random access process with the first base station based on the information on the first base station. The processor 120 may establish an RRC connection based on a random access process with the first base station. The processor 120 may set the operation mode for the second wireless communication to the RRC connection mode based on the random access process with the first base station.

For example, after transmitting a signal for requesting connection with the first base station, the processor 120 may receive, from the second base station, a signal for requesting information on a result of measurement of at least one signal transmitted from the first base station. The processor 120 may transmit information on the result of the measurement to the second base station in response to a signal for requesting information on the result of the measurement. The processor 120 may receive information on the first base station from the second base station based on transmitting information on the result of the measurement to the second base station.

In operation 960, when the state of the electronic device 101 does not correspond to a specified state (operation 920-NO), processor 120 may refrain from performing measurement on at least one signal transmitted from the first base station. The processor 120 may refrain from performing measurement on at least one signal transmitted from the first base station based on identifying that the state of the electronic device 101 is distinguished from the specified state. The processor 120 may skip measuring at least one signal transmitted from the first base station based on identifying that the state of the electronic device 101 is distinguished from the specified state. The processor 120 may bypass measurement of at least one signal transmitted from the first base station based on identifying that the state of the electronic device 101 is distinguished from a specified state. The processor 120 may not measure at least one signal broadcasted from the first base station based on identifying that the state of the electronic device 101 is distinguished from the specified state. When the state of the electronic device 101 does not correspond to a specified state, the processor 120 may not measure at least one signal transmitted from the first base station for at least part of time duration. The processor 120 may wait until a next measurement timing without performing measurement on at least one signal broadcasted from the first base station based on identifying that the state of the electronic device 101 is distinguished from a specified state. Instead of measuring at least one signal transmitted from the first base station, the processor 120 may wait until the next measurement timing, based on identifying that the state of the electronic device 101 is distinguished from the designated state. For example, the processor 120 may wait until the next measurement timing while identifying whether the state of the electronic device 101 corresponds to a specified state, based on periodically or aperiodically identifying that the state of the electronic device 101 is distinguished from the designated state.

According to an embodiment, after identifying that the state of the electronic device 101 is distinguished from the specified state, the processor 120 may identify that the state of the electronic device 101 enters the specified state. The processor 120 may measure at least one signal transmitted from the first base station while the operation mode for the first wireless communication is the RRC idle mode, based on identifying that the state of the electronic device 101 enters the specified state.

For example, the processor 120 may measure at least one signal transmitted from the first base station based on a specified period. The processor 120 may refrain from performing measurement on at least one signal transmitted from the first base station and wait until the next measurement timing, based on identifying that the state of the electronic device 101 is distinguished from the specified designated state. For example, the processor 120 may refrain from performing measurements on at least one signal transmitted from the first base station based on identifying that the state of the electronic device 101 is distinguished from a specified state. After refraining from performing measurement on at least one signal transmitted from the first base station, the processor 120 may identify that the state of the electronic device 101 enters a specified state. After the lapse of a time corresponding to a specified period from the timing of refraining from performing measurement on at least one signal transmitted from the first base station, the processor 120 may measure at least one signal transmitted from the first base station.

According to the above-described embodiment, the processor 120 may measure at least one signal transmitted from the first base station even when the operation mode for the first wireless communication is the RRC idle mode. The processor 120 may measure at least one signal transmitted from the first base station based on identifying that the state of the electronic device 101 corresponds to a specified state.

When identifying that the state of the electronic device 101 corresponds to a specified state, the processor 120 may reduce the current consumption by measuring at least one signal transmitted from the first base station.

Figure 10:
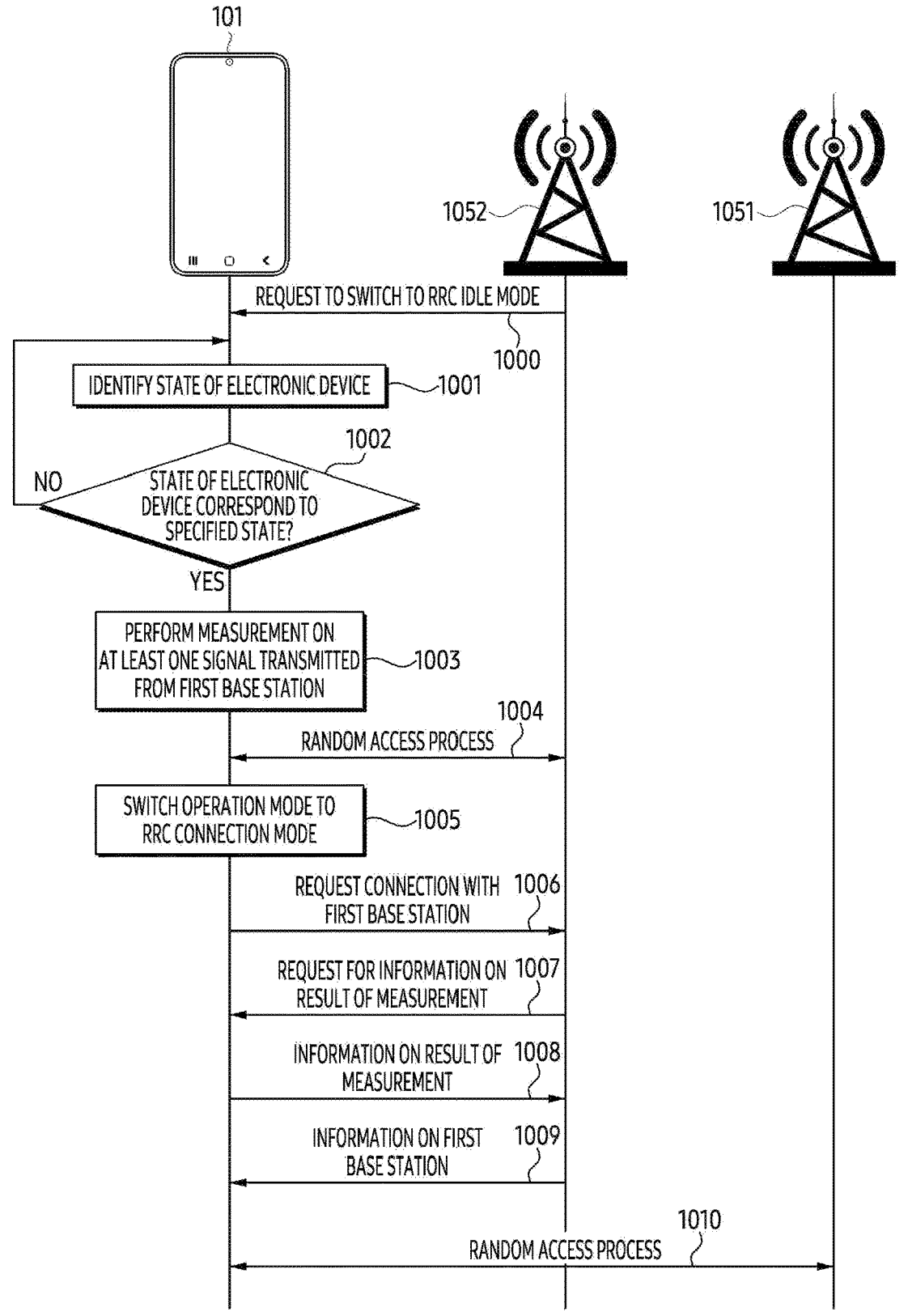
FIG. 10 is a signal flowchart illustrating operations of an electronic device, a first base station, and a second base station according to an embodiment of the disclosure.

FIG. 10 is a signal flowchart illustrating operations of an electronic device, a first base station, and a second base station according to an embodiment of the disclosure.

Referring to FIG. 10, the processor 120 of the electronic device 101 may establish an RRC connection for first wireless communication with the second base station 1052. The processor 120 may perform first wireless communication with the second base station 1052 while the operation mode for the first wireless communication is the RRC connection mode.

In operation 1000, in order to disconnect the RRC connection with the electronic device 101, the second base station 1052 may transmit a request signal for switching the operation mode for the first wireless communication to the RRC idle mode to the electronic device 101. The processor 120 may receive a request signal for switching the operation mode for the first wireless communication to the RRC idle mode from the second base station 1052. The processor 120 may switch the operation mode for the first wireless communication from the RRC connection mode to the RRC idle mode based on the request signal. The processor 120 may disconnect the RRC connection for the first wireless communication with the second base station 1052.

While the operation mode for the first wireless communication is an RRC idle mode, the request signal for switching the operation mode for the first wireless communication to the RRC idle mode may include information for requesting measurement of at least one signal transmitted from the first base station 1051.

For example, the request signal for switching the operation mode for the first wireless communication to the RRC idle mode may include an RRC Release message. The RRC Release message may include information for requesting performance of early measurement.

In operation 1001, the processor 120 may identify the state of the electronic device 101. Operation 1001 may correspond to operation 910 of FIG. 9.

In operation 1002, the processor 120 may identify whether the state of the electronic device 101 corresponds to a specified state. Operation 1002 may correspond to operation 920 of FIG. 9.

In operation 1003, the processor 120 may measure at least one signal transmitted from the first base station 1051. Operation 1003 may correspond to operation 930 of FIG. 9.

In operation 1004, the processor 120 may perform a random access process (e.g., a 4-step RACH process) with the second base station 1052. The processor 120 may perform a random access process with the second base station 1052 by exchanging messages 1 to 4 with the second base station 1052.

For example, the processor 120 may transmit information on the cause of the RRC connection to the second base station 1052. The processor 120 may transmit information on the cause of the RRC connection through the EstablishmentCause field in message 3. For example, the processor 120 may set the value of the EstablishmentCause field to one of emergency, mobile oriented (mo)-signaling, mo-voice-call, mobile terminated (mt)-Access, and mt-data.

In operation 1005, the processor 120 may switch the operation mode for the first wireless communication from the RRC idle mode to the RRC connection mode. The processor 120 may switch the operation mode for the first wireless communication from the RRC idle mode to the RRC connection mode based on the random access process with the second base station 1052. Operation 1005 may correspond to operation 940 of FIG. 9.

In operation 1006, the processor 120 may transmit a signal for requesting connection with the first base station 1051 to the second base station 1052 based on the measurement result of at least one signal transmitted from the first base station 1051. Operation 1006 may correspond to operation 950 of FIG. 9.

According to an embodiment, the signal for requesting connection with the first base station 1051 may include information for indicating whether to transmit information on a measurement result for at least one signal transmitted from the first base station 1051.

For example, the processor 120 may transmit the RRC-SetupComplete message to the second base station 1052. The RRCSetupComplete message may include an idle-MeasAvailable field. The processor 120 may set the value of the idleMeasAvailable field to one of the first value (e.g., True) and the second value (e.g., False) based on the measurement result of at least one signal transmitted from the first base station 1051.

By setting the value of the idleMeasAvailable field to the first value, the processor 120 may instruct to transmit information on a result of measurement for at least one transmitted signal. By setting the value of the idle-MeasAvailable field to the second value, the processor 120 may instruct not to transmit information on a result of measurement for at least one transmitted signal.

For example, the processor 120 may set a value of the idleMeasAvailable field to a first value, based on the result of the measurement for at least one signal transmitted from the first base station 1051 satisfies a specified condition. According to an embodiment, the specified condition may be set by the second base station 1052. According to an embodiment, the satisfied condition may be set by the processor 120. The processor 120 may set the value of the idleMeasAvailable field to the first value based on the identification that a value indicating the strength of at least one signal transmitted from the first base station 1051 is greater than a specified value.

As another example, the processor 120 may set a value of the idleMeasAvailable field to a second value, based on result of measurement for at least one signal transmitted from the first base station 1051 does not satisfy the specified condition.

As another example, the processor 120 may set the value of the idleMeasAvailable field as the second value, based on refraining from measuring at least one signal transmitted from the first base station 1051.

As another example, the processor 120 may set the value of the idleMeasAvailable field to the second value in the random access procedure based on the value of the Estab-lishmentCause field being set to one of emergency, mo-signaling, and mo-voicecall. When small data is required or low throughput is required, the processor 120 may transmit information for indicating not to transmit information on a result of measurement for at least one signal to the second base station 1052.

In operation 1007, the processor 120 may receive a signal for requesting information on a measurement result of at least one signal transmitted from the first base station 1051 from the second base station 1052. For example, the processor 120 may receive the UeinformationRequest message from the second base station 1052. As an example, the value of the idleModeMeasurementReq field in the Ueinforma-tionRequest message may be set to a first value (e.g., True).

In operation 1008, the processor 120 may transmit information on a result of measurement of at least one signal transmitted from the first base station 1051 to the second base station 1052. For example, the processor 120 may transmit information on the result of the measurement to the second base station 1052 based on the measurement result of at least one signal transmitted from the first base station 1051.

For example, the processor 120 may transmit a Ueinfor-mationResponse message to the second base station 1052. The UeinformationResponse message may include information on FR 1 and/or information on FR 2. As an example, the processor 120 may transmit at least one of information on FR 1 and information on FR 2 to the second base station 1052 based on the information about the quality of the signal transmitted within FR 1 and the information about the quality of the signal transmitted within FR 2.

In operation 1009, the processor 120 may receive information on the first base station 1051 from the second base station 1052. For example, the information on the first base station 1051 may include information for establishing a connection with the first base station 1051.

In operation 1010, the processor 120 may perform a random access process with the first base station 1051 based on the information on the first base station 1051. The processor 120 may establish a connection for the second wireless communication with the first base station 1051 by performing a random access process with the first base station 1051.

FIG. 11 is another flowchart illustrating an operation of an electronic device according to an embodiment of the disclosure.

This method may be executed by the electronic device 101 illustrated in FIG. 8 and the processor 120 of the electronic device 101.

Referring to FIG. 11, operations 1110 to 1140 may be related to operations 910 to 930 and 960 of FIG. 9.

In operation 1110, the processor 120 may identify that the internal temperature of the electronic device 101 is less than the reference temperature. The processor 120 may identify information on whether the internal temperature of the electronic device 101 is less than the reference temperature using the sensor 840. The processor 120 may identify that the internal temperature of the electronic device 101 is less than the reference temperature based on information on whether the internal temperature of the electronic device 101 is less than the reference temperature.

In operation 1120, the processor 120 may identify whether the state of the electronic device 101 corresponds to a specified state. For example, the processor 120 may identify that the state of the electronic device 101 corresponds to a specified state based on identifying that the internal temperature of the electronic device 101 is less than a reference temperature. For another example, the processor 120 may identify that the state of the electronic device 101 does not correspond to a specified state based on identifying that the internal temperature of the electronic device 101 is not less than a reference temperature. The processor 120 may identify that the state of the electronic device 101 is distinguished from a specified state based on identifying that the internal temperature of the electronic device 101 is equal to or higher than a reference temperature.

In operation 1130, when the state of the electronic device 101 corresponds to a specified state (operation 1120—YES), the processor 120 may measure at least one signal transmitted from the first base station while the operation mode for the first wireless communication is the RRC idle mode.

Based on identifying that the state of the electronic device 101 corresponds to a specified state, the processor 120 may measure at least one signal transmitted from the first base station while the operation mode for the first wireless communication is the RRC idle mode.

In operation 1140, when the state of the electronic device 101 does not correspond to a specified state (operation 1120—NO), the processor 120 may refrain from performing measurement on at least one signal transmitted from the first base station while the operation mode for the first wireless communication is the RRC idle mode. When the state of the electronic device 101 is distinguished from the specified state, the processor 120 may refrain from performing measurement on at least one signal transmitted from the first base station while the operation mode for the first wireless communication is the RRC idle mode. The processor 120 may refrain from measuring at least one signal transmitted from the first base station while the operation mode for the first wireless communication is the RRC idle mode based on identifying that the state of the electronic device 101 is distinguished from the designated state. The processor 120 may skip performing measurement on at least one signal transmitted from the first base station based on identifying that the state of the electronic device 101 is distinguished from the specified state. The processor 120 may bypass performing measurement on at least one signal transmitted from the first base station based on identifying that the state of the electronic device 101 is distinguished from the specified state. The processor 120 may wait until the next measurement timing without performing measurement on at least one signal broadcast from the first base station based on identifying that the state of the electronic device 101 is distinguished from the specified state. For example, the processor 120 may periodically or aperiodically wait until the next measurement timing while identifying whether the state of the electronic device 101 corresponds to a specified state based on identifying that the state of the electronic device 101 is distinguished from the designated state.

According to an embodiment, after identifying that the state of the electronic device 101 is distinguished from the specified state, the processor 120 may identify that the internal temperature of the electronic device 101 is changed to less than a reference temperature. The processor 120 may identify that the state of the electronic device 101 is changed to a specified state based on identifying that the internal temperature of the electronic device 101 is changed to be less than the reference temperature. The processor 120 may measure at least one signal transmitted from the first base station based on identifying that the state of the electronic device 101 is changed to the specified state.

Figure 12:
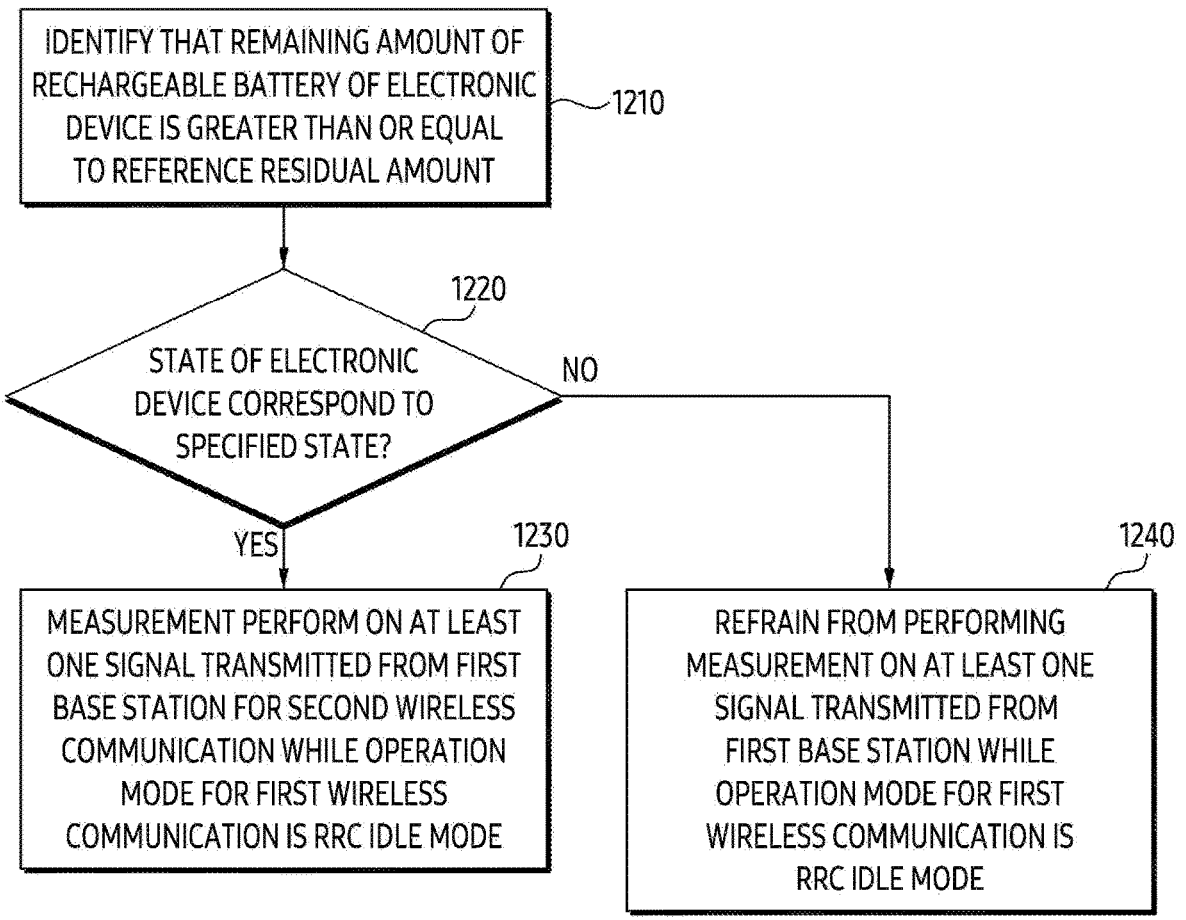
FIG. 12 is another flowchart illustrating an operation of an electronic device according to an embodiment of the disclosure.

FIG. 12 is another flowchart illustrating an operation of an electronic device according to an embodiment of the disclosure.

This method may be executed by the electronic device 101 illustrated in FIG. 8 and the processor 120 of the electronic device 101.

Referring to FIG. 12, operations 1210 to 1240 may be related to operations 910 to 930 and 960 of FIG. 9.

In operation 1210, the processor 120 may identify that the remaining amount of the rechargeable battery 830 of the electronic device 101 is equal to or greater than the reference residual amount. The processor 120 may identify information on whether the remaining amount of the rechargeable battery 830 of the electronic device 101 is equal to or greater than the reference residual amount. The processor 120 may identify that the remaining amount of the rechargeable battery 830 of the electronic device 101 is equal to or greater than the reference residual amount based on information on whether the remaining amount of the rechargeable battery 830 is equal to or greater than the reference residual amount.

In operation 1220, the processor 120 may identify whether the state of the electronic device 101 corresponds to a specified state. For example, the processor 120 may identify that the state of the electronic device 101 corresponds to a specified state based on identifying that the remaining amount of the rechargeable battery 830 is equal to or greater than the reference residual amount. For another example, the processor 120 may identify that the state of the electronic device 101 does not correspond to a specified state based on identifying that the remaining amount of the rechargeable battery 830 is not equal to or greater than the reference residual amount. The processor 120 may identify that the state of the electronic device 101 is distinguished from the satisfied state based on identifying that the remaining amount of the rechargeable battery 830 is less than the reference residual amount.

In operation 1230, when the state of the electronic device 101 corresponds to a specified state (operation 1220—YES), the processor 120 may measure at least one signal transmitted from the first base station while the operation mode for the first wireless communication is the RRC idle mode. Based on identifying that the state of the electronic device 101 corresponds to a specified state, the processor 120 may measure at least one signal transmitted from the first base station while the operation mode for the first wireless communication is the RRC idle mode.

In operation 1240, when the state of the electronic device 101 is distinguished from the specified state (operation 1220—NO), the processor 120 may refrain from performing measurement on at least one signal transmitted from the first base station. The processor 120 may skip performing measurement on at least one signal transmitted from the first base station based on identifying that the state of the electronic device 101 is distinguished from the specified state. The processor 120 may bypass performing measurement on at least one signal transmitted from the first base station based on identifying that the state of the electronic device 101 is distinguished from the specified state. The processor 120 may wait until the next measurement timing without performing measurement on at least one signal broadcast from the first base station based on identifying that the state of the electronic device 101 is distinguished from the specified state. For example, the processor 120 may periodically or aperiodically wait until the next measurement timing while identifying whether the state of the electronic device 101 corresponds to a specified state based on identifying that the state of the electronic device 101 is distinguished from the designated state.

According to an embodiment, after identifying that the state of the electronic device 101 is distinguished from the specified state, the processor 120 may identify that the remaining amount of the rechargeable battery 830 is changed to be greater than or equal to the reference residual amount. The processor 120 may identify that the state of the electronic device 101 is changed to a specified state based on identifying that the remaining amount of the rechargeable battery 830 is changed to be greater than or equal to the reference residual amount. The processor 120 may measure at least one signal transmitted from the first base station based on identifying that the state of the electronic device 101 is changed to the specified state.

Figure 13:
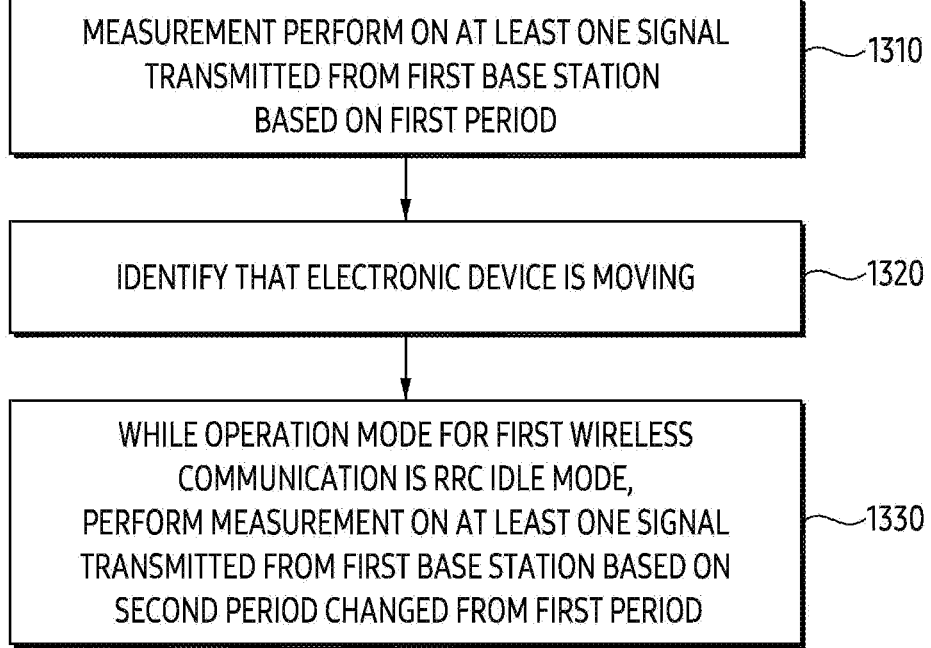
FIG. 13 is another flowchart illustrating an operation of an electronic device according to an embodiment of the disclosure.

FIG. 13 is another flowchart illustrating an operation of an electronic device according to an embodiment of the disclosure.

This method may be executed by the electronic device 101 illustrated in FIG. 8 and the processor 120 of the electronic device 101.

Referring to FIG. 13, operations 1310 to 1330 may correspond to operation 930 of FIG. 9. In operation 1310, the processor 120 may measure at least one signal transmitted from the first base station based on the first period. While the operation mode for the first wireless communication is the RRC idle mode, the processor 120 may measure at least one signal transmitted from the first base station based on the first period.

For example, the processor 120 may measure at least one signal transmitted from the first base station every first period. After time interval corresponding to the first period has elapsed from the timing of performing measurement on at least one signal transmitted from the first base station, the processor 120 may measure at least one other signal transmitted from the first base station.

In operation 1320, the processor 120 may identify that the electronic device 101 is moving. The processor 120 may identify a location or movement of the electronic device 101 using a sensor 840 (e.g., an acceleration sensor). The processor 120 may identify a location or movement of the electronic device 101 using a global positioning system (GPS) circuit (or GNSS communication module). The processor 120 may identify that the electronic device 101 is moving based on the location or movement of the electronic device 101.

In operation 1330, the processor 120 may measure at least one signal transmitted from the first base station based on the second period changed from the first period. The processor 120 may measure at least one signal transmitted from the first base station, based on the second period changed from the first period, while the operation mode for the first wireless communication is the RRC idle mode, based on identifying that the electronic device 101 is moving. For example, the second period may be set shorter than the first period. The processor 120 may measure at least one signal transmitted from the first base station based on a period shorter than when the electronic device 101 is in a stopped state based on that the electronic device 101 is moving.

According to an embodiment, the processor 120 may identify that the electronic device 101 is not moving. The processor 120 may identify that the electronic device 101 is in a stopped state. The processor 120 may maintain the first period without changing based on identifying that the electronic device 101 is in a stopped state. The processor 120 may measure at least one signal transmitted from the first base station based on the first period.

Figure 14:
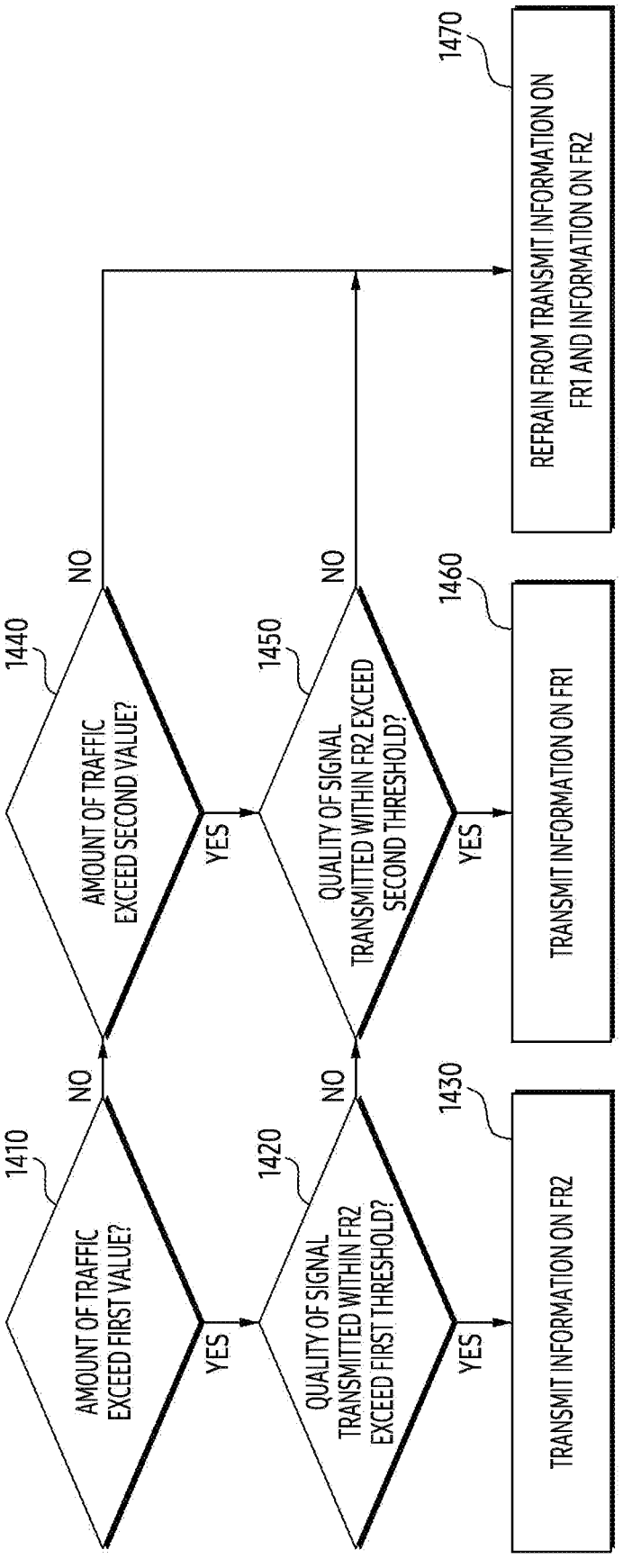
FIG. 14 is another flowchart illustrating an operation of an electronic device according to an embodiment of the disclosure.

FIG. 14 is another flowchart illustrating an operation of an electronic device according to an embodiment of the disclosure.

This method may be executed by the electronic device 101 illustrated in FIG. 8 and the processor 120 of the electronic device 101.

Referring to FIG. 14, in operation 1410, the processor 120 may identify whether the size of traffic exceeds a first value. For example, the processor 120 may identify information on traffic to be transmitted to at least one of the first base station and the second base station. The processor 120 may identify whether the size of the traffic exceeds the first value based on the information on the traffic. For example, the processor 120 may identify a data packet stored in a transmission buffer included in the memory 130. The processor 120 may identify the capacity of the data packet stored in the transmission buffer. The processor 120 may identify whether the size of the traffic exceeds the first value based on the identified capacity of the data packet.

In operation 1420, when the amount of the traffic exceeds the first value (operation 1410—Yes), the processor 120 may identify whether a quality of a signal transmitted within a frequency range (FR) 2 exceeds a first threshold. The processor 120 may identify whether the quality of a signal transmitted in FR 2 exceeds the first threshold based on the amount of traffic exceeding the first value. For example, the processor 120 may identify information on FR 2 based on a signal transmitted in FR 2 from the first base station. The processor 120 may identify whether the quality of a signal transmitted in the FR 2 exceeds the first threshold based on the information on the FR 2.

In operation 1430, when the quality of the signal transmitted within FR2 exceeds the first threshold (operation 1420—YES), the processor 120 may transmit information on FR2 to the second base station. The processor 120 may transmit information on FR 2 to the second base station based on the quality of the signal transmitted in FR 2 exceeding the first threshold. The processor 120 may transmit information on FR 2 to the second base station regardless of the quality of a signal transmitted in FR 1, based on the traffic exceeding the first value and the quality of a signal transmitted in FR 2 from the first base station exceeding the first threshold.

For example, the processor 120 may identify that traffic has occurred. The processor 120 may transmit the RRC-SetupRequest message by setting the establichmentCause field in the RRCSetupRequest message to mo-data. The processor 120 may identify that the amount of traffic exceeds the first value. The processor 120 may transmit the RRC-SetupComplete message by setting the idleMeasAvailable field in the RRCSetupComplete message to a first value (e.g., True) based on the amount of traffic exceeding the first value. Thereafter, the processor 120 may transmit information on the quality of a signal transmitted in FR 2 through the measResultIdleNR field of the UEInformationResponse message based on the quality of the signal transmitted in FR 2 from the first base station exceeding the first threshold.

In operation 1440, when the amount of traffic does not exceed the first value (operation 1410—NO), the processor 120 may identify whether the amount of traffic exceeds the second value. The processor 120 may identify whether the amount of traffic exceeds the second value and is less than or equal to the first value. The processor 120 may identify whether the amount of traffic exceeds the second value based on the amount of traffic being equal to or less than the first value.

In operation 1450, when the amount of the traffic exceeds the second value (operation 1440—YES), the processor 120 may identify whether the quality of the signal transmitted in FR1 exceeds the second threshold. The processor 120 may identify whether the quality of the signal transmitted in FR1 exceeds the second threshold value based on the amount of traffic exceeding the second value.

When the quality of the signal transmitted within FR2 does not exceed the first threshold, the processor 120 may identify whether the quality of the signal transmitted within FR1 exceeds the second threshold. The processor 120 may identify whether the quality of the signal transmitted within FR1 exceeds the second threshold based on the quality of the signal transmitted within FR2 does not exceed the first threshold. The processor 120 may identify whether the quality of the signal transmitted in FR 1 exceeds the second threshold based on the quality of the signal transmitted in FR 2 being equal to or less than the first threshold.

For example, the processor 120 may identify information on FR1 based on a signal transmitted within FR1 from the first base station. Based on the information on FR1, the processor 120 may identify whether the quality of the signal transmitted in FR1 exceeds the second threshold.

In operation 1460, when the quality of the signal transmitted within FR1 exceeds the second threshold value (e.g., operation 1450—YES), the processor 120 may transmit information on FR1 to the second base station. The processor 120 may transmit information on FR 1 to the second base station based on the quality of the signal transmitted in FR 1 exceeding the second threshold.

For example, the processor 120 may identify that the amount of traffic exceeds a first value. The processor 120 may identify that the quality of the signal transmitted within FR 2 from the first base station does not exceed the first threshold. The processor 120 may identify that the quality of the signal transmitted in FR 1 from the first base station exceeds the second threshold. The processor 120 may transmit information on FR 1 to the second base station.

For another example, the processor 120 may identify that the amount of the traffic does not exceed the first value. The processor 120 may identify that the amount of the traffic less than or equal to the first value exceeds the second value. The processor 120 may identify that the quality of the signal transmitted within FR1 from the first base station exceeds the second threshold. The processor 120 may transmit information on FR1 to the second base station.

For example, the processor 120 may identify that traffic has occurred. The processor 120 may transmit the RRC-SetupRequest message by setting the establichmentCause field in the RRCSetupRequest message to mo-data. The processor 120 may identify that the amount of traffic is less than or equal to the first value and exceeds the second value. The processor 120 may transmit the RRCSetupComplete message by setting the idleMeasAvailable field in the RRC-SetupComplete message to a first value (e.g., True) based on identifying that the amount of the traffic is less than or equal to the first value and exceeds the second value. Thereafter, the processor 120 may transmit information on the quality of a signal transmitted in FR 1 through the measResultIdleNR field of the UEInformationResponse message based on identifying from the first base station that the quality of the signal transmitted within FR 2 is less than or equal to the first threshold and the quality of the signal transmitted within FR 1 exceeds the second threshold.

In operation 1470, when the amount of the traffic does not exceed the second value, the processor 120 may refrain from transmitting the information on the FR 1 and the information on the FR 2. The processor 120 may refrain from transmitting information on FR 1 and information on FR 2 based on the amount of traffic not exceeding the second value. The processor 120 may refrain from transmitting information on FR 1 and information on FR 2 based on the amount of the traffic being less than or equal to the second value. The processor 120 may skip transmitting information on FR 1 and information on FR 2 based on the amount of the traffic not exceeding the second value. The processor 120 may bypass transmission of the information on the FR 1 and the information on the FR 2 based on the amount of the traffic does not exceed the second value. The processor 120 may wait until the next transmission timing without performing the transmission of the information on FR 1 and the information on FR 2 based on the amount of the traffic does not exceed the second value. For example, the processor 120 may identify the amount of the traffic periodically or aperiodically, based on the amount of the traffic not exceeding the second value. The processor 120 may wait until the next transmission timing while identifying the amount of the traffic.

When the quality of the signal transmitted within FR1 does not exceed the second threshold, the processor 120 may refrain from transmitting information on FR1 and information on FR2. The processor 120 may refrain from transmitting information on FR1 and information on FR2 based on the quality of the signal transmitted within FR 1 not exceeding the second threshold. The processor 120 may refrain from transmitting information on FR 1 and information on FR 2 based on the quality of the signal transmitted in FR 1 being less than or equal to the second threshold.

For example, the processor 120 may identify that traffic has occurred. The processor 120 may transmit the RRC-SetupRequest message by setting the establichmentCause field in the RRCSetupRequest message to mo-data. The processor 120 may identify that the amount of the traffic is equal to or less than the second value. The processor 120 may transmit the RRCSetupComplete message by setting the idleMeasAvailable field in the RRCSetupComplete message to a second value (e.g., False) based on identifying that the amount of the traffic is less than or equal to the second value. By setting the idleMeasAvailable field to the second value, the processor 120 may refrain from transmitting information on FR 1 and information on FR 2.

For another example, the processor 120 may refrain from transmitting information on FR 1 and information on FR 2, even when the magnitude of the traffic exceeds the first value, based on that the quality of the signal transmitted within FR2 is equal to or less than the first threshold value and the quality of the signal transmitted within FR1 is equal to or less than the second threshold value.

According to an embodiment, the first value, the second value, the first threshold value, and/or the second threshold value may be set by the processor 120. According to an embodiment, the first value, the second value, the first threshold value, and/or the second threshold value may be set by the second base station. The second base station may transmit information on the set first value, the second value, the first threshold value, and/or the second threshold value to the electronic device 101. The processor 120 of the electronic device 101 may receive information on the first value, the second value, the first threshold value, and/or the second threshold value.

FIG. 14 illustrates an example of executing operations 1420 to 1470 after executing operation 1410, but the above-described examples are for convenience of description. For example, the processor 120 may execute operation 1420, operation 1440, and/or operation 1450 before executing operation 1410 or while executing operation 1410.

For example, unlike shown in FIG. 14, the order of operations 1410, operations 1420, operations 1440, and/or operations 1450 may be changed. As another example, operation 1410, operation 1420, operation 1440, and/or operation 1450 may be independently performed. For example, the processor 120 may measure a signal transmitted in FR 1 from the first base station and identify whether the quality of a signal transmitted in FR 1 exceeds a second threshold. The processor 120 may measure a signal transmitted within FR2 from the first base station and identify whether the quality of the signal transmitted within FR2 exceeds a first threshold. Thereafter, the processor 120 may identify the occurrence of traffic and identify whether the amount of the traffic exceeds the first value or the second value.

Figure 15:
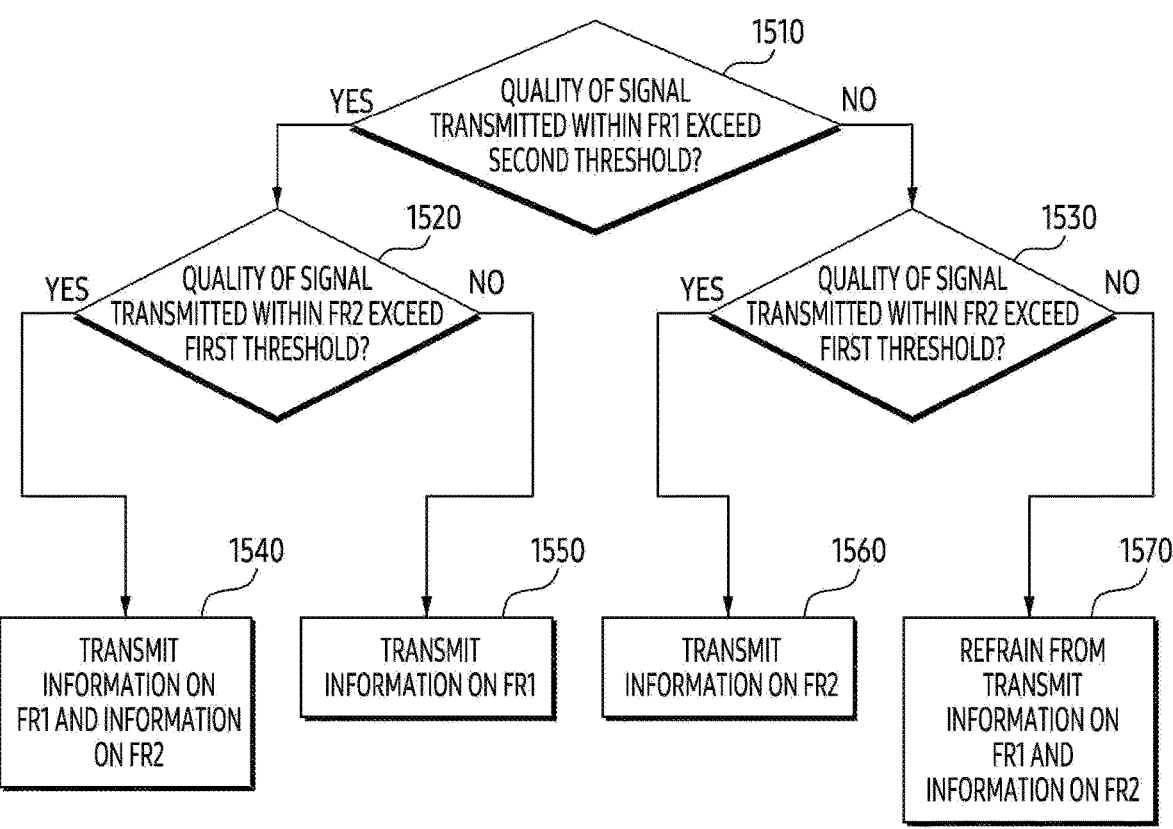
FIG. 15 is another flowchart illustrating an operation of an electronic device according to an embodiment of the disclosure.

FIG. 15 is another flowchart illustrating an operation of an electronic device according to an embodiment of the disclosure.

This method may be executed by the electronic device 101 illustrated in FIG. 8 and the processor 120 of the electronic device 101.

In operation 1510, the processor 120 may identify whether the quality of the signal transmitted within FR1 exceeds the second threshold. Traffic to be transmitted from the second base station to the electronic device 101 may occur. The processor 120 may identify that traffic to be transmitted to the electronic device 101 from the second base station has occurred based on the paging message. Thereafter, the processor 120 may identify whether the quality of the signal transmitted in FR1 exceeds the second threshold.

In operation 1520, the processor 120 may identify whether the quality of the signal transmitted within FR2 exceeds the first threshold when the quality of the signal transmitted within FR1 exceeds the second threshold (operation 1510—YES). The processor 120 may identify whether the quality of the signal transmitted in FR1 exceeds the first threshold based on the quality of the signal transmitted in FR1 exceeds the second threshold.

In operation 1530, when the quality of the signal transmitted within FR1 does not exceed the second threshold (operation 1510—NO), the processor 120 may identify whether the quality of the signal transmitted within FR2 exceeds the first threshold. The processor 120 may identify whether the quality of the signal transmitted within FR2 exceeds the first threshold based on the quality of the signal transmitted within FR1 does not exceed the second threshold.

In operation 1540, the processor 120 may transmit information on FR1 and information on FR2 to the second base station when the quality of the signal transmitted in FR1 exceeds the second threshold, and the quality of the signal transmitted in FR2 exceeds the first threshold (operation 1520—YES). The processor 120 may transmit information on FR1 and information on FR2 to the second base station based on the quality of the signal transmitted within FR 1 exceeding a second threshold and the quality of the signal transmitted within FR 2 exceeding the first threshold.

In operation 1550, the processor 120 may transmit information on FR1 to the second base station when the quality of the signal transmitted within FR1 exceeds the second threshold and the quality of the signal transmitted within FR2 does not exceed the first threshold (operation 1520—NO). The processor 120 may transmit information on FR1 to the second base station based on the quality of the signal transmitted within FR 1 exceeding the second threshold and the quality of the signal transmitted within FR 2 not exceeding the first threshold.

In operation 1560, when the quality of the signal transmitted within FR1 does not exceed the second threshold, and the quality of the signal transmitted within FR2 exceeds the first threshold (operation 1530—YES), the processor may transmit information on FR2 to the second base station. The processor 120 may transmit information on FR2 to the second base station based on the quality of the signal transmitted within FR 1 not exceeding the second threshold and the quality of the signal transmitted within FR 2 exceeding the first threshold.

In operation 1570, when the quality of the signal transmitted within FR1 does not exceed the second threshold and the quality of the signal transmitted within FR2 does not exceed the first threshold (operation 1530—NO), the processor 120 may refrain from transmitting information on FR1 and information on FR2. Processor 120 may refrain from transmitting information on FR1 and information on FR2 based on the quality of the signal transmitted within FR 1 not exceeding the second threshold and the quality of the signal transmitted within FR 2 not exceeding the first threshold. The processor 120 may skip transmitting information on FR 1 and information on FR 2 based on the quality of the signal transmitted within FR 1 not exceeding the second threshold and the quality of the signal transmitted within FR 2 not exceeding the first threshold. The processor 120 may bypass transmitting information for FR 1 and information for FR 2 based on the quality of the signal transmitted within FR 1 not exceeding the second threshold and the quality of the signal transmitted within FR 2 not exceeding the first threshold. The processor 120 may wait until the next transmission timing without performing transmission of the information on FR 1 and information on FR 2 based on the quality of the signal transmitted within FR 1 not exceeding the second threshold and the quality of the signal transmitted within FR 2 not exceeding the first threshold. For example, the processor 120 may identify, periodically or aperiodically, the quality of the transmitted signal, based on the quality of the signal transmitted within FR 1 not exceeding the second threshold and the quality of the signal transmitted within FR 2 not exceeding the first threshold. The processor 120 may wait until the next transmission timing while identifying the quality of the transmitted signal.

FIG. 15 illustrates an example of executing operations 1520 to 1530 after executing operation 1510, but this is for convenience of description. For example, unlike shown in FIG. 15, after identifying whether the quality of the signal transmitted in FR2 exceeds the first threshold value, the processor 120 may identify whether the quality of the signal transmitted in FR1 exceeds the second threshold. For another example, an operation of identifying whether the quality of a signal transmitted within FR2 exceeds a first threshold and an operation of identifying whether the quality of a signal transmitted within FR1 exceeds a second threshold may be performed simultaneously (or independently).

Figure 16:
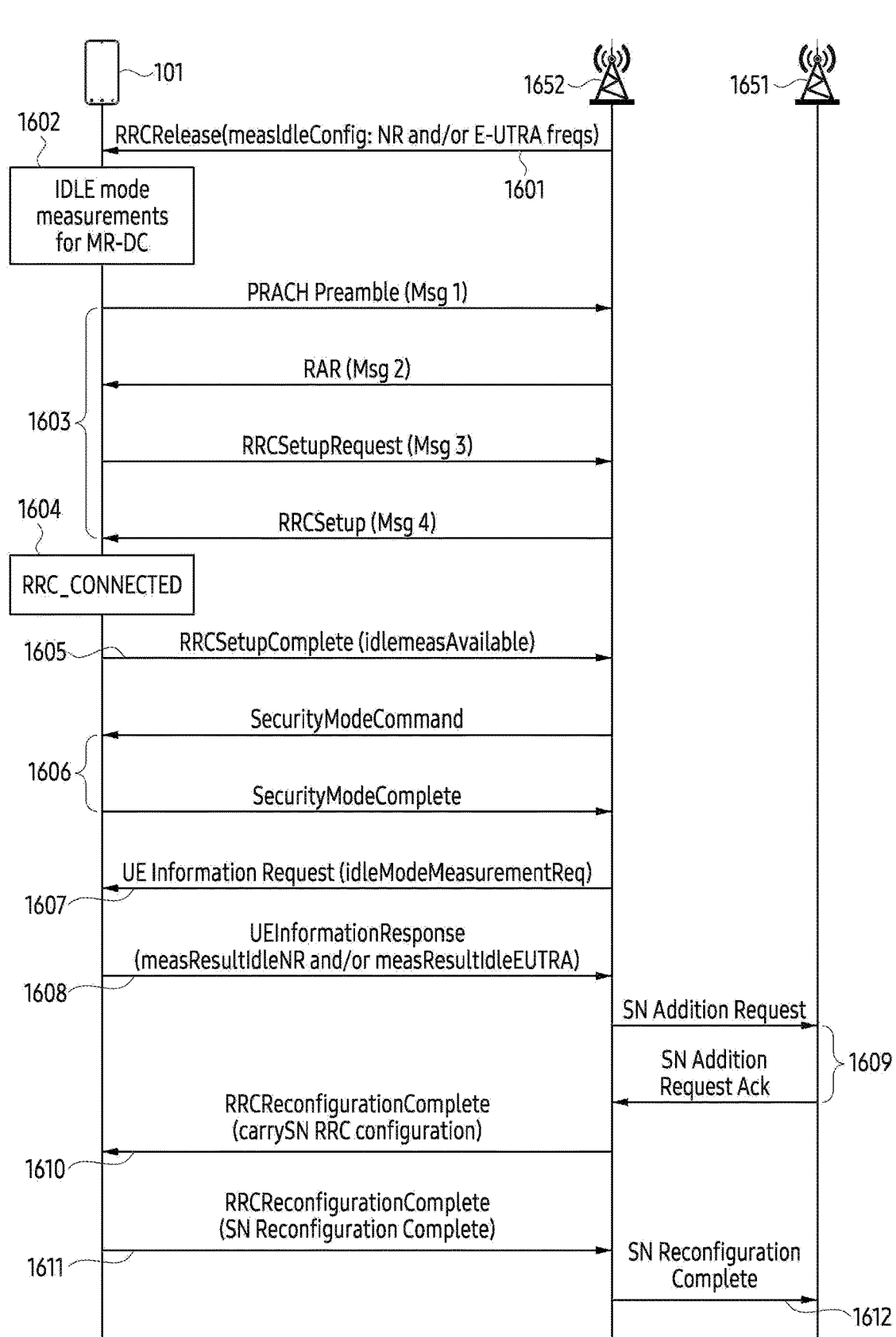
FIG. 16 is a signal flowchart illustrating operations of an electronic device, a first base station, and a second base station according to an embodiment of the disclosure.

FIG. 16 is a signal flowchart illustrating operations of an electronic device, a first base station, and a second base station according to an embodiment of the disclosure.

Operations 1601 to 1612 may be examples of operations 910 to 960 of FIG. 9.

Referring to FIG. 16, in operation 1601, the second base station 1652 (e.g., LTE base station) may transmit an RRC Release message to the electronic device 101. The RRC Release message may be an example of a request signal for switching the operation mode for the first wireless communication to the RRC idle mode.

For example, the RRC Release message may include information for requesting performance of early measurement. Information for requesting performance of early measurement may be included in the measIdleConfig field.

In operation 1602, the processor 120 of the electronic device 101 may switch the operation mode for the first wireless communication from the RRC connection mode to the RRC idle mode. The processor 120 may measure at least one signal transmitted from the first base station 1651 (e.g., NR base station) in the RRC idle mode. The processor 120 may perform an early measurement process. For example, the processor 120 may identify whether to perform an early measurement process based on the state of the electronic device 101. The processor 120 may identify whether to perform the early measurement process based on whether the electronic device 101 is in heat generation, battery remaining capacity, and/or power saving mode. The processor 120 may periodically perform the early measurement process, and may change the performance period of the early measurement process based on the movement of the electronic device 101.

In operation 1603, the processor 120 may perform a random access process with the second base station 1652. The processor 120 may perform a 4-step RACH process with the second base station 1652.

Although not shown, when traffic to be transmitted to the electronic device 101 occurs in the second base station 1652, the second base station 1652 may transmit a paging message including identification information of the electronic device 101. The processor 120 may perform a random access process with the second base station 1652 based on the paging message.

In operation 1604, the processor 120 may switch the operation mode for the first wireless communication from the RRC idle mode to the RRC connection mode. The processor 120 may switch the operation mode for the first wireless communication from the RRC idle mode to the RRC connection mode based on the 4-step RACH process.

In operation 1605, the processor 120 may transmit the RRCSetupComplete message to the second base station 1652. The RRCSetupComplete message may include an idleMeasAvailable field. The processor 120 may set a value of the idleMeasAvailable field to one of true and false. For example, the processor 120 may set the value of the idle-MeasAvailable field to true based on the plan to transmit the result of the early measurement process. For another example, the processor 120 may set the value of the idle-MeasAvailable field to false based on that the result of the early measurement process is not to be transmitted. For another example, the processor 120 may set the value of the idleMeasAvailable field to false based on not performing the early measurement process.

For example, the processor 120 may set the value of the idleMeasAvailable field to false based on that the amount of traffic generated in the electronic device 101 is smaller than a specified value.

According to an embodiment, the processor 120 may set a value of the idleMeasAvailable field based on the amount of traffic generated in the electronic device 101, a required throughput, a result of an early measurement process, or a priority.

For example, the processor 120 may set the value of the idleMeasAvailable field to false based on that the quality of the signal transmitted from the first base station 1651 in FR1 is equal to or less than the second threshold value, and the quality of the signal transmitted from the first base station 1651 in FR2, is equal to or less than the first threshold value.

In operation 1606, the processor 120 may perform a security setting process by transmitting a SecurityMode command message to the second base station 1652 and receiving the SecurityModeComplete message from the second base station 1652.

In operation 1607, the processor 120 may receive a UEInformationRequest message from the second base station 1652. The UEInformationRequest message may include information for requesting the result of the early measurement process. The UEInformationRequest message may include an idleModeMeasurementReq field. The second base station 1652 may request the result of the early measurement process from the electronic device 101 by setting the idleModeMeasurementReq field to true.

In operation 1608, the processor 120 may transmit a UEInformationResponse message to the second base station 1652. The UEInformationResponse message may include a measResultIdleNR field. The processor 120 may transmit the result of the early measurement process to the second base station 1652 through the measResultIdleNR field.

In operation 1609, the second base station 1652 may transmit a secondary node (SN) Addition Request message to the first base station 1651. The first base station 1651 may transmit an SN Addition Request Acknowledgment message to the second base station 1652 in response to the SN Addition Request message.

In operation 1610, the second base station 1652 may transmit an RRCReconfigurationComplete message to the electronic device 101. The RRCReconfigurationComplete message may include information on the first base station 1651. The information on the first base station 1651 may include information for performing second wireless communication with the first base station 1651.

In operation 1611, the processor 120 may transmit an RRCReconfigurationComplete message to the second base station 1652.

In operation 1612, the second base station 1652 may transmit an SN Reconfiguration Complete message to the first base station 1651.

After operation 1612 is performed, the processor 120 may perform a random access process with the first base station 1651 and may establish a connection (e.g., RRC connection) with the first base station 1651 based on the random access process.

According to an embodiment, an electronic device (e.g., the electronic device 101 of FIG. 8) may comprise a first communication circuit (e.g., the first communication circuit 810 of FIG. 8) for a first wireless communication; a second communication circuit (e.g., the second communication circuit 820 of FIG. 8) for a second wireless communication; one or more processors (e.g., the processor 120 of FIG. 8) operably coupled with the first communication circuit and the second communication circuit; and memory storing one or more programs including instructions that, when executed by the one or more processors, cause the electronic device to, while an operation mode for the first wireless communication is a radio resource control (RRC) idle mode, identify a state of the electronic device. The at least one processor may be configured to, when the state of the electronic device corresponds to a specified state: perform measurement on at least one signal transmitted from a first base station for the second wireless communication while the operation mode is the RRC idle mode, after performing the measurement, switch the operation mode from the RRC idle mode to an RRC connected mode, and within the state in which the operation mode is the RRC connected mode, based on result of the measurement, transmit a signal for requesting a connection with the first base station to a second base station for the first wireless communication. The at least one processor may be configured to, when the state of the electronic device does not correspond to the specified state, refrain from performing the measurement on the at least one signal transmitted from the first base station.

According to an embodiment, the one or more programs further include instructions that, when executed by the one or more processors, cause the electronic device to identify, based on at least one of information on whether internal temperature of the electronic device is less than reference temperature, information on whether remaining amount of a rechargeable battery of the electronic device is equal to or more than reference residual amount, or information on whether the electronic device is in a low power state, the state of the electronic device, while the operation mode for the first wireless communication is the RRC idle mode.

According to an embodiment, the one or more programs further include instructions that, when executed by the one or more processors, cause the electronic device to: based on the information on whether the internal temperature of the electronic device is less than the reference temperature, identify that the internal temperature of the electronic device is less than the reference temperature, based on identifying that the internal temperature of the electronic device is less than the reference temperature, identify that the state of the electronic device corresponds to the specified state and based on identifying that the state of the electronic device corresponds to the specified state, perform the measurement on the at least one signal transmitted from the first base station while the operation mode is the RRC idle mode.

According to an embodiment, the one or more programs further include instructions that, when executed by the one or more processors, cause the electronic device to: identify that a remaining amount of the rechargeable battery of the electronic device is equal to or greater than the reference residual amount based on information on whether the remaining amount of the rechargeable battery of the electronic device is equal to or greater than the reference residual amount, based on identifying that the remaining amount of the rechargeable battery of the electronic device is equal to or greater than the reference residual amount, identify that the state of the electronic device corresponds to the specified state, and based on identifying that the state of the electronic device corresponds to the specified state, perform the measurement on the at least one signal transmitted from the first base station while the operation mode is the RRC idle mode.

According to an embodiment, the one or more programs further include instructions that, when executed by the one or more processors, cause the electronic device to, when the state of the electronic device does not correspond to the specified state, identify that the state of the electronic device enters the specified state, and based on identifying that the state of the electronic device enters the specified state, perform the measurement on the at least one signal transmitted from the first base station while the operation mode is the RRC idle mode.

According to an embodiment, the one or more programs further include instructions that, when executed by the one or more processors, cause the electronic device to perform, based on a first period, the measurement on the at least one signal transmitted from the first base station while the operation mode is the RRC idle mode.

According to an embodiment, the one or more programs further include instructions that, when executed by the one or more processors, cause the electronic device to identify that the electronic device is moving, and based on identifying that the electronic device is moving, perform, based on a second period changed from the first period, the measurement on the at least one signal transmitted from the first base station while the operation mode is the RRC idle mode.

According to an embodiment, the one or more programs further include instructions that, when executed by the one or more processors, cause the electronic device to: identify a synchronization signal/physical broadcast channel (SS/PBCH) block transmitted from the first base station as the at least one signal transmitted from the first base station, and identify at least one of a reference signal received power (RSRP), a reference signal received quality (RSRQ), and a received signal strength indicator (RSSI) for the SS/PBCH block.

According to an embodiment, the one or more programs further include instructions that, when executed by the one or more processors, cause the electronic device to, after performing the measurement, receive a paging message comprising identification information on the electronic device from the second base station, based on the paging message, perform a random access process with the second base station, and based on the random access process, switch the operation mode from the RRC idle mode to the RRC connected mode.

According to an embodiment, the one or more programs further include instructions that, when executed by the one or more processors, cause the electronic device to, identify information on traffic to be transmitted to at least one of the first base station and the second base station, after performing the measurement, based on the information on the traffic, perform a random access process with the second base station, and based on the random access process, switch the operation mode from the RRC idle mode to the RRC connected mode.

According to an embodiment, the one or more programs further include instructions that, when executed by the one or more processors, cause the electronic device to identify information on traffic to be transmitted to at least one of the first base station and the second base station, after performing the measurement. The at least one signal transmitted from the first base station may comprise a signal transmitted within a frequency range (FR) 1 from the first base station and a signal transmitted within FR 2 from the first base station.

According to an embodiment, the one or more programs further include instructions that, when executed by the one or more processors, cause the electronic device to obtain, based on the signal transmitted in the FR 1 from the first base station, information on the FR 1, obtain, based on the signal transmitted in the FR 2 from the first base station, information on the FR 2, and transmit the signal for requesting the connection with the first base station to the second base station for the first wireless communication.

According to an embodiment, the signal for requesting the connection with the first base station may be set to one of a signal for requesting the connection with the first station within the FR 1 and a signal for requesting the connection with the first station within the FR 2.

According to an embodiment, the one or more programs further include instructions that, when executed by the one or more processors, cause the electronic device to identify that size of the traffic exceeds a first value, based on the information on the traffic, identify that the communication with the first base station is possible within the FR 2, based on the information on the FR 2, based on identifying that the communication with the first base station is possible within the FR 2, and transmit the signal for requesting a connection in the FR 2 with the first base station.

According to an embodiment, the one or more programs further include instructions that, when executed by the one or more processors, cause the electronic device to: identify that the size of the traffic, which is less than or equal to the first value, exceeds a second value, based on the information on the traffic, identify that the communication with the first base station is possible within the FR 1, based on the information on the FR 1, and based on identifying that the communication with the first base station is possible within the FR 1, transmit the signal for requesting a connection in the FR 1 with the first base station.

According to an embodiment, the one or more programs further include instructions that, when executed by the one or more processors, cause the electronic device to: receive, based on the signal for requesting the connection with the first base station, information on the first base station from the second base station, and based on the information on the first base station, perform a random access process with the first base station.

According to an embodiment, the one or more programs further include instructions that, when executed by the one or more processors, cause the electronic device to receive a signal for switching the operation mode from the RRC connected mode to the RRC idle mode, based on the signal for switching the operation mode from the RRC connected mode to the RRC idle mode, identify the state of the electronic device while the operation mode is the RRC idle mode. The signal for switching the operation mode from the RRC connected mode to the RRC idle mode may comprise information for requesting to perform the measurement on the at least one signal transmitted from the first base station, while the operation mode is the RRC idle mode.

According to an embodiment, the one or more programs further include instructions that, when executed by the one or more processors, cause the electronic device to receive a signal for requesting information on result of the measurement from the second base station, and in response to the signal for requesting the information on the result of the measurement, transmit the information on the result of the measurement to the second base station.

According to an embodiment, a method performed by an electronic device may comprise while an operation mode for the first wireless communication is a radio resource control (RRC) idle mode, identifying a state of the electronic device. The method may comprise, when the state of the electronic device corresponds to a specified state, performing measurement on at least one signal transmitted from a first base station for a second wireless communication while the operation mode is the RRC idle mode, after performing the measurement, switching the operation mode from the RRC idle mode to an RRC connected mode, and within the state in which the operation mode is the RRC connected mode, based on result of the measurement, transmitting a signal for requesting a connection with the first base station to a second base station for a first wireless communication. The method may comprise, when the state of the electronic device does not correspond to the specified state, refraining from performing the measurement on the at least one signal transmitted from the first base station.

According to an embodiment, a computer readable storage medium storing one or more programs may cause the electronic device to: while an operation mode for the first wireless communication is a radio resource control (RRC) idle mode, identify a state of the electronic device. The one or more programs may cause the electronic device to, when the state of the electronic device corresponds to a specified state, perform measurement on at least one signal transmitted from a first base station for the second wireless communication while the operation mode is the RRC idle mode. The one or more programs may cause the electronic device to, after performing the measurement, switch the operation mode from the RRC idle mode to an RRC connected mode, and within the state in which the operation mode is the RRC connected mode, based on result of the measurement, transmit a signal for requesting a connection with the first base station to a second base station for the first wireless communication. The one or more programs may cause the electronic device to, when the state of the electronic device does not correspond to the specified state, refrain from performing the measurement on the at least one signal transmitted from the first base station.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a first communication circuit for a first wireless communication;
a second communication circuit for a second wireless communication;
one or more processors operably coupled with the first communication circuit and the second communication circuit; and
memory storing one or more programs including instructions that, when executed by the one or more processors, cause the electronic device to:
while an operation mode for the first wireless communication is a radio resource control (RRC) idle mode, identify a state of the electronic device,
when the state of the electronic device corresponds to a specified state:
perform measurement on at least one signal transmitted from a first base station for the second wireless communication while the operation mode is the RRC idle mode,
after performing the measurement, switch the operation mode from the RRC idle mode to an RRC connected mode, and
within the state in which the operation mode is the RRC connected mode, based on result of the measurement, transmit a signal for requesting a connection with the first base station to a second base station for the first wireless communication, and
when the state of the electronic device does not correspond to the specified state, refrain from performing the measurement on the at least one signal transmitted from the first base station.

2. The electronic device of claim 1, wherein the one or more programs further include instructions that, when executed by the one or more processors, cause the electronic device to:
identify, based on at least one of information on whether internal temperature of the electronic device is less than reference temperature, information on whether remaining amount of a rechargeable battery of the electronic device is equal to or more than reference residual amount, or information on whether the electronic device is in a low power state, the state of the electronic device, while the operation mode for the first wireless communication is the RRC idle mode.

3. The electronic device of claim 2, wherein the one or more programs further include instructions that, when executed by the one or more processors, cause the electronic device to:
based on the information on whether the internal temperature of the electronic device is less than the reference temperature, identify that the internal temperature of the electronic device is less than the reference temperature,
based on identifying that the internal temperature of the electronic device is less than the reference temperature, identify that the state of the electronic device corresponds to the specified state, and
based on identifying that the state of the electronic device corresponds to the specified state, perform the measurement on the at least one signal transmitted from the first base station while the operation mode is the RRC idle mode.

4. The electronic device of claim 2, wherein the one or more programs further include instructions that, when executed by the one or more processors, cause the electronic device to:
identify that a remaining amount of the rechargeable battery of the electronic device is equal to or greater than the reference residual amount based on information on whether the remaining amount of the rechargeable battery of the electronic device is equal to or greater than the reference residual amount,
based on identifying that the remaining amount of the rechargeable battery of the electronic device is equal to or greater than the reference residual amount, identify that the state of the electronic device corresponds to the specified state, and
based on identifying that the state of the electronic device corresponds to the specified state, perform the measurement on the at least one signal transmitted from the first base station while the operation mode is the RRC idle mode.

5. The electronic device of claim 1, wherein the one or more programs further include instructions that, when executed by the one or more processors, cause the electronic device to:
when the state of the electronic device does not correspond to the specified state, identify that the state of the electronic device enters the specified state, and
based on identifying that the state of the electronic device enters the specified state, perform the measurement on the at least one signal transmitted from the first base station while the operation mode is the RRC idle mode.

6. The electronic device of claim 1, wherein the one or more programs further include instructions that, when executed by the one or more processors, cause the electronic device to:

perform, based on a first period, the measurement on the at least one signal transmitted from the first base station while the operation mode is the RRC idle mode.

7. The electronic device of claim 6, wherein the one or more programs further include instructions that, when executed by the one or more processors, cause the electronic device to:

identify that the electronic device is moving, and based on identifying that the electronic device is moving, perform, based on a second period changed from the first period, the measurement on the at least one signal transmitted from the first base station while the operation mode is the RRC idle mode.

8. The electronic device of claim 7, wherein the one or more programs further include instructions that, when executed by the one or more processors, cause the electronic device to:

identify a synchronization signal/physical broadcast channel (SS/PBCH) block transmitted from the first base station as the at least one signal transmitted from the first base station, and identify at least one of a reference signal received power (RSRP), a reference signal received quality (RSRQ), and a received signal strength indicator (RSSI) for the SS/PBCH block.

9. The electronic device of claim 1, wherein the one or more programs further include instructions that, when executed by the one or more processors, cause the electronic device to:

after performing the measurement, receive a paging message comprising identification information on the electronic device from the second base station, based on the paging message, perform a random access process with the second base station, and based on the random access process, switch the operation mode from the RRC idle mode to the RRC connected mode.

10. The electronic device of claim 1, wherein the one or more programs further include instructions that, when executed by the one or more processors, cause the electronic device to:

identify information on traffic to be transmitted to at least one of the first base station and the second base station, after performing the measurement, based on the information on the traffic, perform a random access process with the second base station, and based on the random access process, switch the operation mode from the RRC idle mode to the RRC connected mode.

11. The electronic device of claim 1, wherein the one or more programs further include instructions that, when executed by the one or more processors, cause the electronic device to:

identify information on traffic to be transmitted to at least one of the first base station and the second base station, after performing the measurement, wherein the at least one signal transmitted from the first base station comprises a signal transmitted within a frequency range (FR) 1 from the first base station and a signal transmitted within FR 2 from the first base station.

12. The electronic device of claim 11, wherein the one or more programs further include instructions that, when executed by the one or more processors, cause the electronic device to:

obtain, based on the signal transmitted in the FR 1 from the first base station, information on the FR 1, obtain, based on the signal transmitted in the FR 2 from the first base station, information on the FR 2, and transmit the signal for requesting the connection with the first base station to the second base station for the first wireless communication.

13. The electronic device of claim 12, wherein the signal for requesting the connection with the first base station is set to one of a signal for requesting the connection with the first base station within the FR 1 and a signal for requesting the connection with the first base station within the FR 2.

14. A method performed by an electronic device, the method comprising:

while an operation mode for a first wireless communication is a radio resource control (RRC) idle mode, identifying a state of the electronic device;

when the state of the electronic device corresponds to a specified state:

performing measurement on at least one signal transmitted from a first base station for a second wireless communication while the operation mode is the RRC idle mode, after performing the measurement, switching the operation mode from the RRC idle mode to an RRC connected mode, and within the state in which the operation mode is the RRC connected mode, based on result of the measurement, transmitting a signal for requesting a connection with the first base station to a second base station for a first wireless communication; and when the state of the electronic device does not correspond to the specified state, refraining from performing the measurement on the at least one signal transmitted from the first base station.

15. The method of claim 14, further comprising:

identifying, based on at least one of information on whether internal temperature of the electronic device is less than reference temperature, information on whether remaining amount of a rechargeable battery of the electronic device is equal to or more than reference residual amount, or information on whether the electronic device is in a low power state, the state of the electronic device, while the operation mode for the first wireless communication is the RRC idle mode.

16. The method of claim 15, further comprising:

based on the information on whether the internal temperature of the electronic device is less than the reference temperature, identifying that the internal temperature of the electronic device is less than the reference temperature, based on identifying that the internal temperature of the electronic device is less than the reference temperature, identifying that the state of the electronic device corresponds to the specified state, and based on identifying that the state of the electronic device corresponds to the specified state, performing the measurement on the at least one signal transmitted from the first base station while the operation mode is the RRC idle mode.

17. The method of claim 15, further comprising:

identifying that a remaining amount of the rechargeable battery of the electronic device is equal to or greater than the reference residual amount based on information on whether the remaining amount of the rechargeable battery of the electronic device is equal to or greater than the reference residual amount, based on identifying that the remaining amount of the rechargeable battery of the electronic device is equal to or greater than the reference residual amount, identifying that the state of the electronic device corresponds to the specified state, and based on identifying that the state of the electronic device corresponds to the specified state, performing the measurement on the at least one signal transmitted from the first base station while the operation mode is the RRC idle mode.

18. The method of claim 14, further comprising:

when the state of the electronic device does not correspond to the specified state, identifying that the state of the electronic device enters the specified state, and based on identifying that the state of the electronic device enters the specified state, performing the measurement on the at least one signal transmitted from the first base station while the operation mode is the RRC idle mode.

19. One or more non-transitory computer-readable storage media storing one or more programs including instructions that, when executed by one or more processors of an electronic device with a first communication circuit for a first wireless communication and a second communication circuit for a second wireless communication, cause the electronic device to perform operations, the operations comprising:

while an operation mode for the first wireless communication is a radio resource control (RRC) idle mode, identifying a state of the electronic device;

when the state of the electronic device corresponds to a specified state:

performing measurement on at least one signal transmitted from a first base station for the second wireless communication while the operation mode is the RRC idle mode, after performing the measurement, switching the operation mode from the RRC idle mode to an RRC connected mode, and within the state in which the operation mode is the RRC connected mode, based on result of the measurement, transmitting a signal for requesting a connection with the first base station to a second base station for the first wireless communication; and when the state of the electronic device does not correspond to the specified state, refraining from performing the measurement on the at least one signal transmitted from the first base station.

20. The one or more non-transitory computer-readable storage media of claim 19, the operations further comprising:

identifying, based on at least one of information on whether internal temperature of the electronic device is less than reference temperature, information on whether remaining amount of a rechargeable battery of the electronic device is equal to or more than reference residual amount, or information on whether the electronic device is in a low power state, the state of the electronic device, while the operation mode for the first wireless communication is the RRC idle mode.

* * * * *